United States Patent
Flockencier

(10) Patent No.: US 7,312,856 B2
(45) Date of Patent: Dec. 25, 2007

(54) PROGRAMMABLE PULSE CAPTURE DEVICE WITH AUTOMATIC GAIN CONTROL

(75) Inventor: Stuart W. Flockencier, Cedar Hill, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 524 days.

(21) Appl. No.: 10/242,188

(22) Filed: Sep. 12, 2002

(65) Prior Publication Data

US 2004/0051859 A1 Mar. 18, 2004

(51) Int. Cl.
G01C 3/08 (2006.01)
H03G 3/20 (2006.01)

(52) U.S. Cl. .................. 356/5.01; 356/4.01; 356/4.07; 330/278; 250/214 AG

(58) Field of Classification Search ...... 356/3.01–5.15, 356/28; 330/277–285; 250/214 AG, 214 DC
See application file for complete search history.

(56) References Cited

U.S. PATENT DOCUMENTS

| | | | |
|---|---|---|---|
| 3,900,261 A * | 8/1975 | Wingate | 356/5.03 |
| 3,951,549 A * | 4/1976 | Fowler et al. | 356/5.03 |
| 4,136,467 A | 1/1979 | O'Rourke et al. | 35/25 |
| 4,209,832 A | 6/1980 | Gilham et al. | 364/521 |
| 4,515,471 A | 5/1985 | Eden | 356/5 |
| 4,515,472 A | 5/1985 | Welch | 356/5 |
| 4,528,525 A | 7/1985 | Eden et al. | 332/7.51 |
| 4,590,368 A * | 5/1986 | Govaert | 250/207 |
| 5,200,606 A | 4/1993 | Krasutsky et al. | 250/216 |
| 5,224,109 A | 6/1993 | Krasutsky et al. | 372/29 |
| 5,243,553 A | 9/1993 | Flockencier | 356/5 |
| 5,285,461 A | 2/1994 | Krasutsky et al. | 372/29 |
| 5,357,331 A | 10/1994 | Flockencier | 356/5 |
| 5,396,510 A * | 3/1995 | Wilson | 356/28 |
| 5,428,439 A * | 6/1995 | Parker et al. | 356/5.01 |
| 5,511,015 A | 4/1996 | Flockencier | 364/728.01 |
| 5,644,386 A | 7/1997 | Jenkins et al. | 356/4.01 |
| 5,682,225 A | 10/1997 | DuBois et al. | 356/73 |
| 5,701,326 A | 12/1997 | Flowers | 372/99 |
| 5,767,953 A * | 6/1998 | McEwan | 356/5.01 |
| 5,852,492 A | 12/1998 | Nimblett et al. | 356/5.04 |
| 5,893,085 A | 4/1999 | Phillips et al. | 706/52 |
| 5,896,064 A * | 4/1999 | Kaku | 330/279 |
| 5,898,483 A | 4/1999 | Flowers | 356/4.01 |
| 6,040,898 A * | 3/2000 | Mrosik et al. | 356/5.09 |
| 6,115,113 A | 9/2000 | Flockencier | 356/5.01 |
| 6,150,649 A * | 11/2000 | Wake et al. | 250/208.1 |
| 6,225,618 B1 * | 5/2001 | Rushing et al. | 250/214 AG |

(Continued)

*Primary Examiner*—Isam Alsomiri
(74) *Attorney, Agent, or Firm*—Williams, Moragn & Amerson, P.C.

(57) ABSTRACT

The invention an optical system and a method for automatically controlling the gain of a receiver in an optical system. The optical system includes an optical receiver, a pulse capture unit, and an automatic gain control. The pulse capture unit includes a capture unit capable of capturing an optical signal received by the optical receiver; and, a process unit capable of processing the captured optical signal. The automatic gain control is capable of controlling the gain of the optical receiver responsive to the content of the processed optical signal. The method includes comparing the intensity of at least one returned pulse, and typically a plurality of returned pulses, to a predetermined value; and controlling the gain of an optical detector responsive to the comparison. In addition, the maximum gain is controlled by a noise limit in some implementations.

45 Claims, 21 Drawing Sheets

U.S. PATENT DOCUMENTS

| | | | |
|---|---|---|---|
| 6,262,800 B1 | 7/2001 | Minor | 356/139.07 |
| 6,510,339 B2 * | 1/2003 | Kovtun et al. | 600/509 |
| 6,577,196 B2 * | 6/2003 | Hart | 330/279 |

* cited by examiner

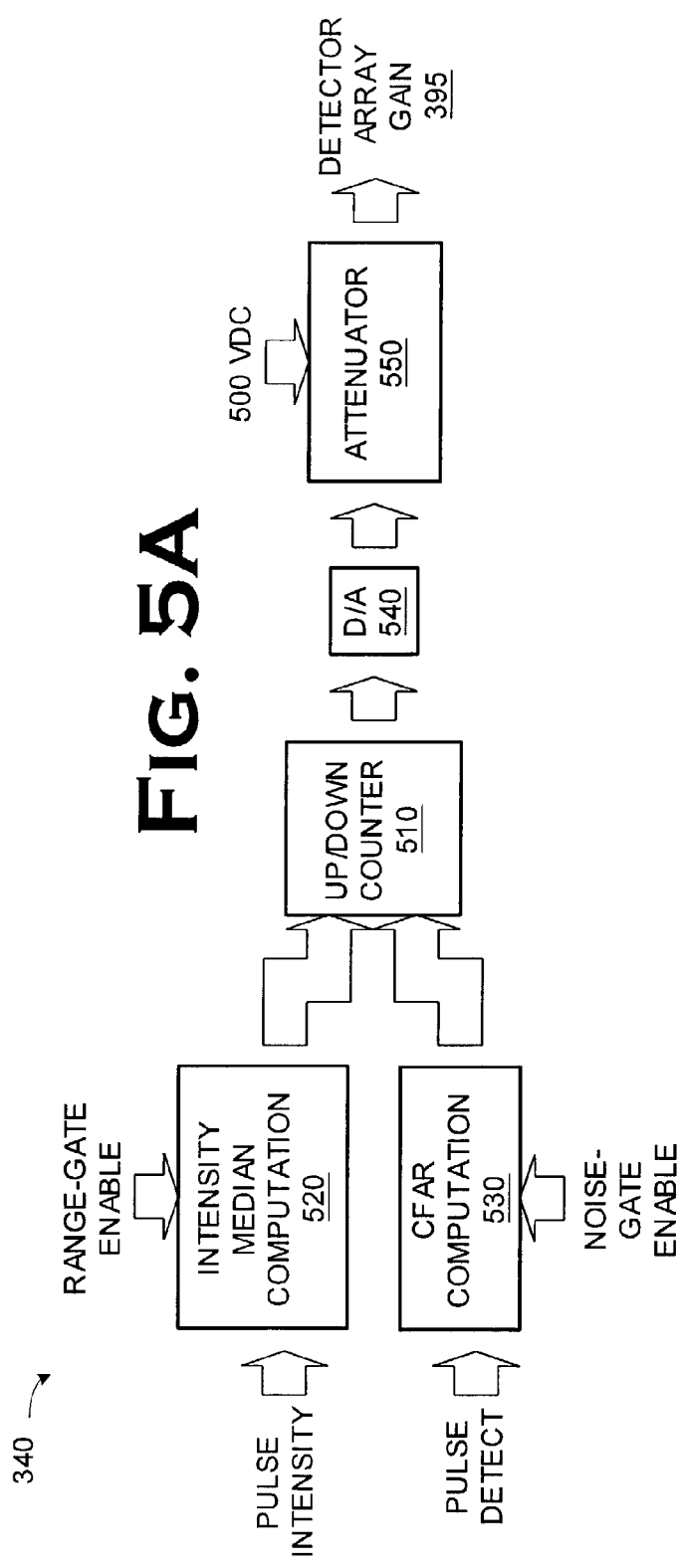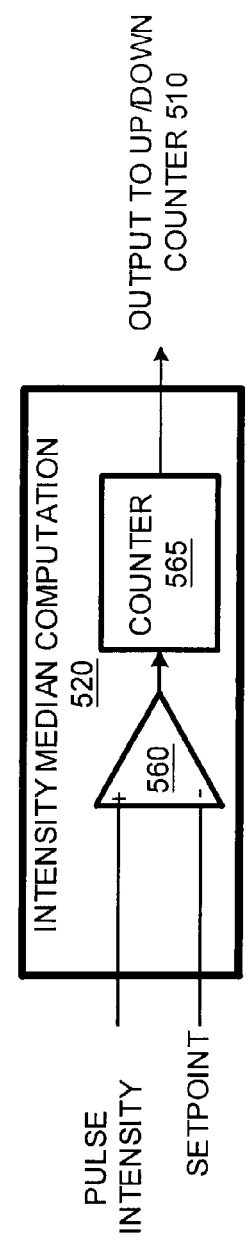

| n | $Z_n$ |
|---|---|
| -1 | 0 |
| 0 | $A_0$ |
| 1 | $2A_0 + A_1$ |
| 2 | $3A_0 + 2A_1 + A_2$ |
| 3 | $2A_0 + 3A_1 + 2A_2 + A_3$ |
| 4 | $A_0 + 2A_1 + 3A_2 + 2A_3 + A_4$ |
| 5 | $A_1 + 2A_2 + 3A_3 + 2A_4 + A_5$ |
| 6 | $A_2 + 2A_3 + 3A_4 + 2A_5 + A_6$ |
| . | . |
| . | . |
| . | . |
FIG. 15
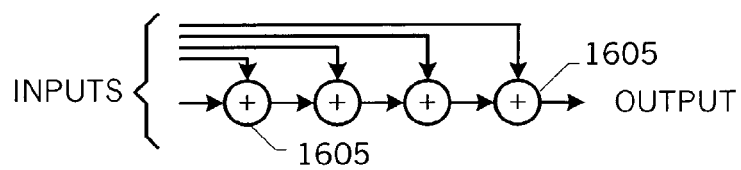
FIG. 16
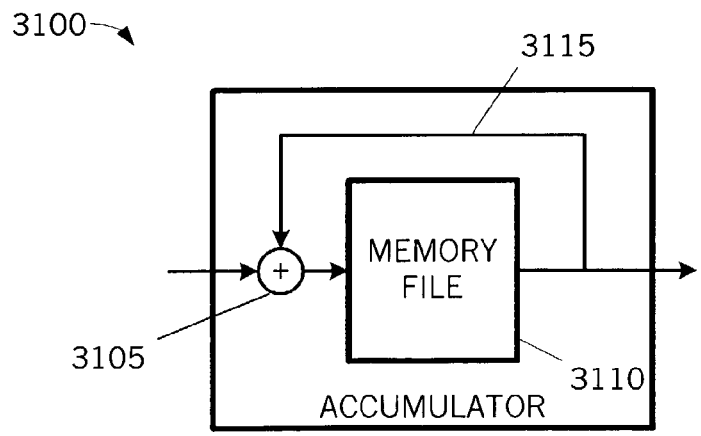
FIG. 31

| n | $B_n$ | $C_n = \Sigma B_n$ | $Z_n = \Sigma C_n$ |
|---|---|---|---|
| -1 | 0 | 0 | 0 |
| 0 | $A_0$ | $A_0$ | $A_0$ |
| 1 | $A_1$ | $A_0 + A_1$ | $2A_0 + A_1$ |
| 2 | $A_2$ | $A_0 + A_1 + A_2$ | $3A_0 + 2A_1 + A_2$ |
| 3 | $A_3 - 2A_0$ | $-A_0 + A_1 + A_2 + A_3$ | $2A_0 + 3A_1 + 2A_2 + A_3$ |
| 4 | $A_4 - 2A_1$ | $-A_0 - A_1 + A_2 + A_3 + A_4$ | $A_0 + 2A_6 + 3A_7 + 2A_8 + A_9$ |
| 5 | $A_5 - 2A_2$ | $-A_0 - A_1 - A_2 + A_3 + A_4 + A_5$ | $A_1 + 2A_6 + 3A_7 + 2A_8 + A_9$ |
| 6 | $A_6 - 2A_3 + A_0$ | $-A_1 - A_2 - A_3 + A_4 + A_5 + A_6$ | $A_2 + 2A_6 + 3A_7 + 2A_8 + A_9$ |
| 7 | $A_7 - 2A_4 + A_1$ | $-A_2 - A_3 - A_4 + A_5 + A_6 + A_7$ | $A_3 + 2A_6 + 3A_7 + 2A_8 + A_9$ |
| 8 | $A_8 - 2A_5 + A_2$ | $-A_3 - A_4 - A_5 + A_6 + A_7 + A_8$ | $A_4 + 2A_6 + 3A_7 + 2A_8 + A_9$ |
| 9 | $A_9 - 2A_6 + A_3$ | $-A_4 - A_5 - A_6 + A_7 + A_8 + A_9$ | $A_5 + 2A_6 + 3A_7 + 2A_8 + A_9$ |
| . | . | . | . |

PROGRAMMABLE PULSE CAPTURE DEVICE WITH AUTOMATIC GAIN CONTROL

BACKGROUND OF THE INVENTION

1. Field of the Invention

The present invention pertains to laser detection and ranging ("LADAR") systems, and, more particularly, to the pulse capture electronics of LADAR systems.

2. Description of the Related Art

A need of great importance in some military and civilian operations is the ability to quickly detect, locate, and/or identify objects, frequently referred to as "targets," in a "field of view." A common problem in military operations, for example, is to detect and identify targets, such as tanks, vehicles, guns, and similar items, which have been camouflaged or which are operating at night or in foggy weather. It is important in many instances to reliably distinguish between enemy and friendly forces. As the pace of battlefield operations increases, so does the need for quick and accurate identification of potential targets as friend or foe, and as a target or not.

Useful techniques for identifying targets have existed for many years. For instance, in World War II, the British developed and utilized radio detection and ranging ("RADAR") systems for identifying the incoming planes of the German Luftwaffe. RADAR uses radio waves to locate objects at great distances even in bad weather or in total darkness. Sound navigation and ranging ("SONAR") has found similar utility and application in environments where signals propagate through water, as opposed to the atmosphere. While RADAR and SONAR have proven quite effective in many applications, they are inherently limited by a number of factors. For instance, RADAR is limited because it uses radio frequency signals and large antennas used to transmit and receive such signals. Thus, alternative technologies have been developed and deployed.

One such alternative technology is laser detection and ranging ("LADAR"). Similar to RADAR systems, which transmit radio waves and receive radio waves reflected from objects, LADAR systems transmit laser beams and receive reflections from targets. In LADAR systems, brief laser pulses are generated and transmitted via an optical scanning mechanism. Some of the transmitted pulses strike a target and are reflected back to a receiver associated with the transmitter. The time between the transmission of a laser pulse and the receipt of the reflected laser pulse (a "return pulse") is used to calculate the "range" from the target to the object that receives the return pulse.

Because LADAR provides range information, the data is "three-dimensional," i.e., it provides information about the target in three dimensions. Typically, these dimensions are range, azimuth, and elevation. The shorter wavelengths of light signals (relative to radio signals) also provide much higher resolution and tighter beam control. These attributes of LADAR data greatly assist not only with target location, but also target identification. Thus, in many respects, LADAR systems can provide much greater performance than can, e.g., RADAR and SONAR systems.

The evolution of one particular LADAR system can be traced by reviewing the following issued U.S. Letters Patent:

U.S. Pat. No. 5,243,553, entitled "Gate Array Pulse Capture Device," issued Sep. 7, 1993, to Loral Vought Systems Corporation as the assignee of the inventor Stuart W. Flockencier;

U.S. Pat. No. 5,357,331, entitled "System for Processing Reflected Energy Signals," issued Oct. 18, 1994, to Loral Vought Systems Corporation as the assignee of the inventor Stuart W. Flockencier;

U.S. Pat. No. 5,511,015, entitled "Double-Accumulator Implementation of the Convolution Function," issued Apr. 23, 1996, to Loral Vought Systems Corporation as the assignee of the inventor Stuart W. Flockencier; and U.S. Pat. No. 6,115,113, entitled "Method for Increasing Single-Pulse Range Resolution," issued Sep. 5, 2000, to Lockheed Martin Corporation as the assignee of the inventor Stuart W. Flockencier.

These patents all describe the data acquisition electronics, or "pulse capture electronics" ("PCE"), of the LADAR system. They also disclose a LADAR transceiver whose operation is more fully disclosed in the following patents, among others:

U.S. Pat. No. 5,200,606, entitled "Laser Radar Scanning System," issued Apr. 6, 1993, to LTV Missiles and Electronics Group as the assignee of the inventors Nicholas J. Krasutsky, et al.

U.S. Pat. No. 5,224,109, entitled "Laser Radar Transceiver," issued Jun. 29, 1993, to LTV Missiles and Electronics Group as the assignee of the inventors Nicholas J. Krasutsky, et al.; and U.S. Pat. No. 5,285,461, entitled "Improved Laser Radar Transceiver," issued to Feb. 8, 1994, to Loral Vought Systems Corporation as assignee of the inventors Nicholas J. Krasutsky, et al.

This LADAR system also processes the acquired data for a number of end uses, such as those more fully disclosed in a number of patents, including:

U.S. Pat. No. 5,644,386, entitled "Visual Recognition System for LADAR Sensors," issued Jul. 1, 1997, to Loral Vought Systems Corp. as assignee of the inventors Gary Kim Jenkins, et al.

U.S. Pat. No. 5,852,492, entitled "Fused Lasar Range/Intensity Image Display for a Human Interpretation of Lasar Data," issued Dec. 22, 1998, to Lockheed Martin Vought Systems Corp. as the assignee of the inventors Donald W. Nimblett, et al.; and U.S. Pat. No. 5,893,085, entitled "Dynamic Fuzzy Logic Process for Identifying Objects in Three-Dimensional Data," issued Apr. 6, 1999, to Lockheed Martin Corp. as the assignee of the inventors Ronald W. Philips, et al.

Each of these patents is commonly assigned herewith to the assignee of this invention, Lockheed Martin Corporation.

One concern with virtually all LADAR receivers is the "gain" of their detectors. The gain controls the amount of amplification applied by the detector to a return pulse when it is received. The gain should be commensurate with the intensity of the return pulse. If the intensity of the return pulse is high, then the gain of the detector should be low to avoid over-saturating the detector's components. On the other hand, if the intensity is low, the gain should be high to facilitate subsequent processing, although not so high that "noise" is reported as a return pulse.

Setting the detector's gain, however, is fraught with many difficulties. The intensity of return pulses can vary wildly from one moment to the next and creates difficulty in setting the gain for any particular intensity level. Setting the gain arbitrarily high unnecessarily risks over-saturating the detector's components for high intensity returns and erroneously reporting noise as returned pulses. On the other hand, setting the gain unnecessarily low risks missing low intensity returns.

The present invention is directed to resolving, or at least reducing, one or all of the problems mentioned above.

SUMMARY OF THE INVENTION

The invention, in its various aspects and embodiments, includes an optical system and a method for automatically controlling the gain of a receiver in an optical system. The optical system comprises an optical receiver, a pulse capture unit, and an automatic gain control. The pulse capture unit includes a capture unit capable of capturing an optical signal received by the optical receiver; and, a process unit capable of processing the captured optical signal. The automatic gain control is capable of controlling the gain of the optical receiver responsive to the content of the processed optical signal. The method comprises comparing the intensity of a returned pulse to a predetermined value; and controlling the gain of an optical detector responsive to the comparison.

BRIEF DESCRIPTION OF THE DRAWINGS

The invention may be understood by reference to the following description taken in conjunction with the accompanying drawings, in which like reference numerals identify like elements, and in which:

FIG. 5A is a block diagram of an automatic gain control ("AGC") for the pulse capture electronics in accordance with the present invention;

FIG. 5B illustrates one embodiment of a intensity median computation unit in the AGC in FIG. 5A;

FIG. 12 to FIG. 16 illustrate a first implementation of a convolution circuit of FIG. 11, wherein:

FIG. 12 is a graph of a filter coefficient stream ("FCS") representing an example of an input signal for two matched filter implementations;

FIG. 13 is a table illustrating the convolution of the sample function of FIG. 12 for times ($t_{-1}, t_0, t_1, \ldots t_6$) and for each of "n" samples;

FIG. 14 and FIG. 15 comprise a block diagram and an input/output table, respectively, which illustrate a conventional high-speed circuit approach for convoluting an input signal to the circuit; and FIG. 16 shows 2-input adders with which a summation circuit of FIG. 14 is implemented in one particular embodiment;

FIG. 17 to FIG. 31 illustrate a second implementation of the convolution circuit of FIG. 11 alternative to that illustrated in FIG. 12 to FIG. 16, wherein:

FIG. 17 is a block diagram of a D-A convolver circuit;

FIG. 18 and FIG. 19 graph the respective first and second derivatives, respectively, of the FCS represented by FIG. 12;

FIG. 20 illustrates a set of D-A coefficients, obtained in accordance with the present invention by taking the second derivative of the filter coefficient stream of FIG. 12 against the axis $B_n$;

FIG. 21 to FIG. 23 illustrate a series of line segments representing examples of input function from which the D-A coefficients are ascertained for use in connection with the present invention;

FIG. 24 is a block diagram of a simplified D-A convolver circuit after elimination of the "zero" terms and tailored for the FCS of FIG. 12 and FIG. 20;

FIG. 25 diagrams the D-A circuit of FIG. 24 implementing the accumulators therein with the accumulator design of FIG. 31;

FIG. 26 diagrams the D-A circuit of FIG. 24 implementing the accumulators therein with the accumulator design of FIG. 31 in a manner alternative to that shown in FIG. 25;

FIG. 27 is a table illustrating a process for performing the computations associated with the derivation of the D-A coefficients for the FCS of FIG. 12;

FIG. 28 is a table illustrating the results of using the D-A circuit of FIG. 14;

FIG. 29 diagrams a software-programmable, shift-register implementation of a D-A convolving method;

FIG. 30 diagrams a D-A convolver implemented in a RAM-based circuit; and

FIG. 31 is a circuit diagram illustrating an implementation of one of the accumulators shown in FIG. 17;

Figure 1:
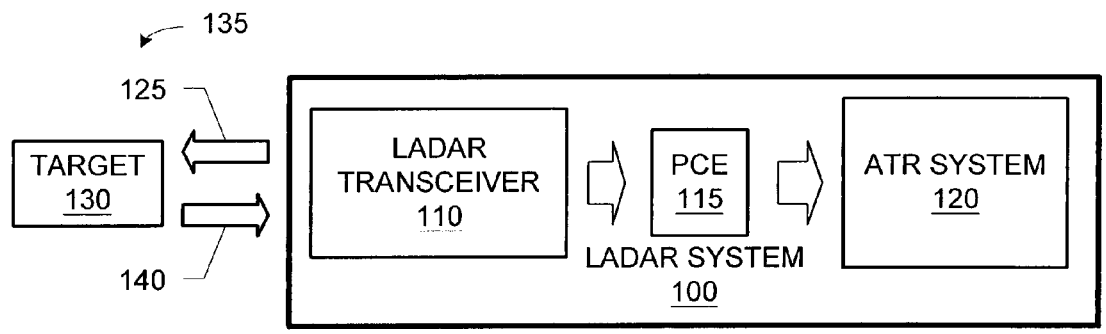
FIG. 1 depicts, in a block diagram, one particular embodiment of a LADAR system employing the present invention.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The present invention uses a median-value approach to the gain-control mechanism of an optical system. Statistically, using the median is more robust than averaging or single-sample techniques. Other methods of determining the median of a large set values are very computationally intensive that the present invention greatly reduces. Only one comparison computation is required per input sample. Each one of a sequential set of input samples is compared (once) against the median set-point and a counter increments the number of "greater than" results. After a predetermined number of comparison cycles, the counter value represents how close the gain-control mechanism has achieved the desired median. If the counter is at half maximum value, the median has been achieved. Any deviation from this "half value" is proportional to the error. The gain-control mechanism then uses this deviation to "close the loop" and force the error to approach zero over the course of several comparison cycles. This process can provide smooth adaptive control as both external and internal conditions change.

The maximum gain is also typically, though not in all embodiments, limited by an active noise measurement technique. This technique keeps the Constant False Alarm Rate ("CFAR") due to detector and background random noise from exceeding a predetermined level. The technique is adaptive to changing conditions and allows the maximum gain possible when signals are weak. Statistically, random noise (per time increment) is equally likely during any period of measurement. Thus the level of random noise can be determined during a period when no return signal is expected. The number of noise occurrences in several periods are accumulated and then evaluated. If and when that number equals or exceeds an allowable CFAR limit, the gain is prohibited from increasing and may be slightly decreased.

FIG. 1 illustrates one particular embodiment of the present invention, a LADAR system 100. The LADAR system 100 comprises a LADAR transceiver 110, some pulse capture electronics ("PCE") 115, and an automatic target recognition ("ATR") system 120. The LADAR transceiver 110 emits a train of laser light pulses 125 into a field of view 135 when triggered by a signal from the PCE 115. The field of view 135, more particularly shown in FIG. 2, comprises the volume defined by the propagation boundaries 222 of the emitted pulses 125 and the plane 224 in accordance with conventional practice. The plane 224 represents the maximum range of the LADAR transceiver 110. Referring now to both FIG. 1 and FIG. 2, the emitted pulses 125 reflect off a target 130. The return pulses 140 are then collected by the LADAR transceiver 110 and captured by the PCE 115. The PCE 115 then processes the collected return pulses 140 to generate a three-dimensional data set for processing by the ATR system 120.

Figure 3:
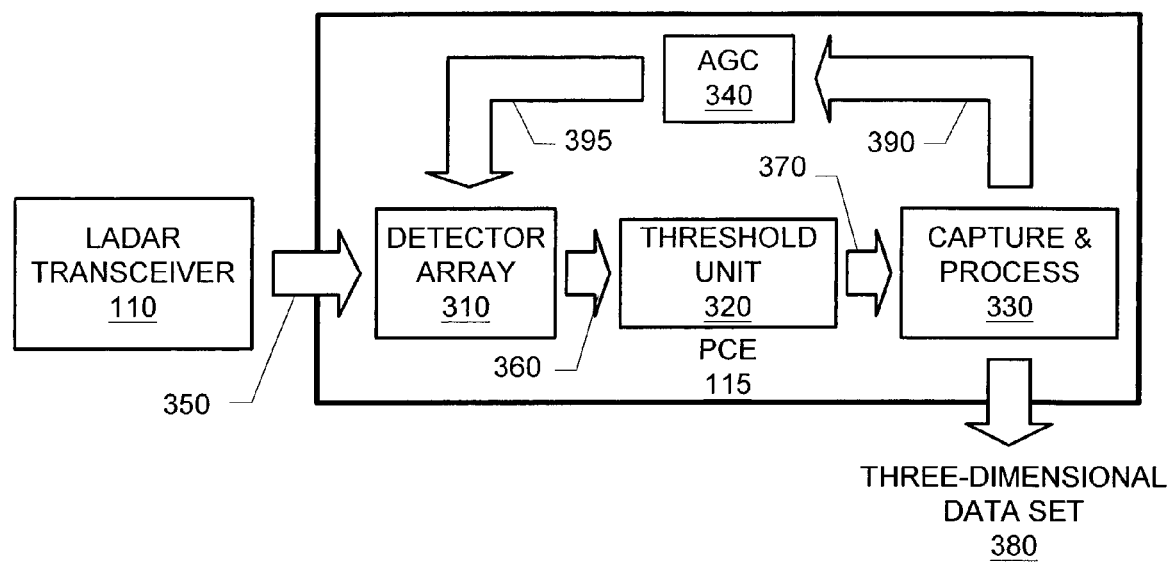
FIG. 3 is a block diagram of selected portions of the pulse capture electronics of the LADAR system of FIG. 1.

FIG. 3 depicts selected portions of the PCE 115 in FIG. 1 in a block diagram. The PCE 115 includes a detector array 310, a threshold unit 320, a capture and process unit 330, and an automatic gain control ("AGC") 340. The detector array 310 receives an optical signal 350 from the LADAR transceiver 110 and converts it to an analog electrical signal 360. The threshold unit 320 produces a continuous digital representation 370 of the analog electrical signal 360, from which the capture and process unit 330 produces a three-dimensional data set 380. As will be discussed further below, the capture and process unit 330 delivers information 390 to the AGC 340, which delivers a detector array gain signal 395 to the detector array 310. In accordance with one aspect of the present invention, the PCE 115 employs the AGC 340 to variably control the gain of the detector array 310. The gain for the detector array 310 is commensurate with the intensity of the return pulse 140. If the intensity of the return pulse 140 is high, then the gain of the detector array 340 is low and, if the intensity is low, the gain is high.

In the illustrated embodiment, the LADAR transceiver 110 continually sends input data in the form of an optical signal 350 to the PCE 115. This input data is sometimes core data, e.g., the optical signal 350 is the collected return pulse 140 (shown in FIG. 1). Sometimes, the input data is incidental data, e.g., the optical signal 350 is optical background noise from the field of view 135 (also shown in FIG. 1). Note that noise can also result from the operation of the detector array 310, since electro-optical detectors are notoriously noisy components. Sometimes the input data contains no useful information.

Figure 4:
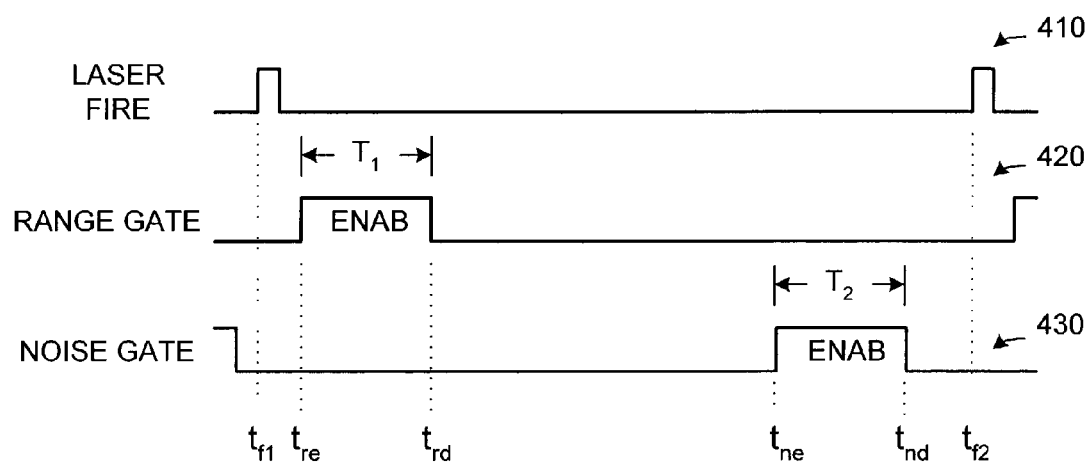
FIG. 4 is a timing diagram for selected events occurring during data acquisition.

To help separate these conditions, and for other reasons, the PCE 115 employs a timing mechanism illustrated in FIG. 4, wherein the capture and process unit 330 acts as a "gate" to control when the optical signal 350 is processed by the PCE 115. The LADAR transceiver 110 fires the laser at a time $t_{f1}$ on the clock 410, which is delivered to the LADAR transceiver 110 by the PCE 115. At some predetermined time $t_{re}$ after the time $t_{f1}$, shown on the clock 420, the range gate (not shown) of the capture and process unit 330 is enabled for a predetermined period of time $T_1$. Any data in the optical signal 350 during this time period $T_1$ is assumed to be core data, i.e., a collected, or "true," return pulse 140. At a time $t_{rd}$ on the clock 430, the range gate is disabled and the time period $T_1$ terminates on the assumption that no more desirable data will be received. At some predetermined time $t_{ne}$ after $t_{rd}$ ends the time period $T_1$, but before the laser fires again at $t_{f2}$, the noise gate (also not shown) is enabled for a time period $T_2$ that ends before $t_{f2}$. Any data received in the optical signal 350 during this period $T_2$ is assumed to be incidental data, e.g., noise.

The times and widths of the time periods $T_1$, $T_2$ are determined by the operational parameters of the LADAR system 100. The location and width of the time period $T_1$ is defined by some expectation of the flight time for the emitted pulse 125 to reflect back to the LADAR transceiver 110. For instance, one might assume that only targets greater than 100 m but less than 2 km of the LADAR transceiver 110 will be detected and identified. This assumption, given the speed of light, will yield the times $t_{re}$ and $t_{rd}$. The width of the time period $T_2$ may be selected on some arbitrary basis, but a width equal to the width of the time period $T_1$ is employed in the illustrated embodiment. The time period $T_3$ between the time periods $T_1$, $T_2$ also may be arbitrarily selected, provided that the sum of $T_1$, $T_2$, and $T_3$ is less than the period of the laser firing clock 410. However, in the illustrated embodiment, the time period $T_3$ is set at least as long as it takes the capture and process unit 330 to process any data received in the time period $T_1$. Also, the time period $T_2$ preferably ends after the capture and process unit 330 operates on the incidental data as is described further below.

Turning now to FIG. 5A, both the core data acquired during the time period $T_1$ and the incidental data acquired during the time period $T_2$ are used by the AGC 340. The AGC 340, in the illustrated embodiment, includes an up/down counter 510 driven by an intensity median computation, at 520, and a constant false alarm rate ("CFAR") computation, at 530. Note that some alternative embodiments may omit the CFAR computation 530. The intensity median computation 520 drives the up/down counter 510 up and down depending on whether the intensity of the return pulse 140 is higher or lower, respectively, than some predetermined value. Typically, most implementations will employ a plurality of return pulses 140 in this fashion. The CFAR computation 530 clamps, or imposes, an upper limit on the content of the up/down counter 510, and thus the gain of the detector array 310 (shown in FIG. 3), upon detecting a noise event. In one particular embodiment, the CFAR computation 530 not only clamps the value, it drives the value down one count to back off the gain that produced the noise event.

More particularly, when the range gate (not shown) is enabled during the period T1, shown in FIG. 4, the intensity median computation 520 compares the median intensity of the return pulse 140 against some setpoint having a predetermined value. As is shown in FIG. 5B, the intensity median computation 520 includes a comparator 560 that receives as input the pulse intensity and the predetermined setpoint. The result of the comparison by the comparator 560 drives the up/down counter 565, whose content is proportional to the error in the detector array gain 395. The output of the intensity median computation 520 then drives the up/down counter 510 up and down responsive to the result of that comparison. In one embodiment, the up/down counter 565 is changed by plus or minus one count depending on the sign of the error. In other embodiments, the up/down counter 565 can be changed by multiple counts as a function of the sign and magnitude of the error. After a predetermined number of pulses, the content of the up/down counter 565 is examined. If the median has been achieved, the intensity of half the pulses will have been above the setpoint and half below. In this circumstance, the content of the up/down counter 565 should be unchanged. If the median of the return pulse 140 is higher than the predetermined value, the intensity median computation 520 drives the up/down counter 510 down, but drives the up/down counter 510 up if the intensity is lower than the predetermined value.

When the noise gate (not shown) is enabled during the period $T_2$, shown in FIG. 4, the CFAR computation 530 determines how many false alarms there are, i.e., noise events detected as returned pulses, and limits the value of the up/down counter 510. Note that such noise events may be from any source, e.g., background noise collected by the LADAR transceiver 110 or noise introduced by the detector array 310.

The content of the up/down counter 510 is converted to an analog signal by the A/D converter 540. The analog count is then used by the attenuator 550 to attenuate the 500 Vdc power supplied to the detector array 310 to produce the detector array gain signal 395. The attenuator 550 is implemented in one particular embodiment using field effect transistor ("FET") technology, but any suitable technology may be employed.

Figure 6:
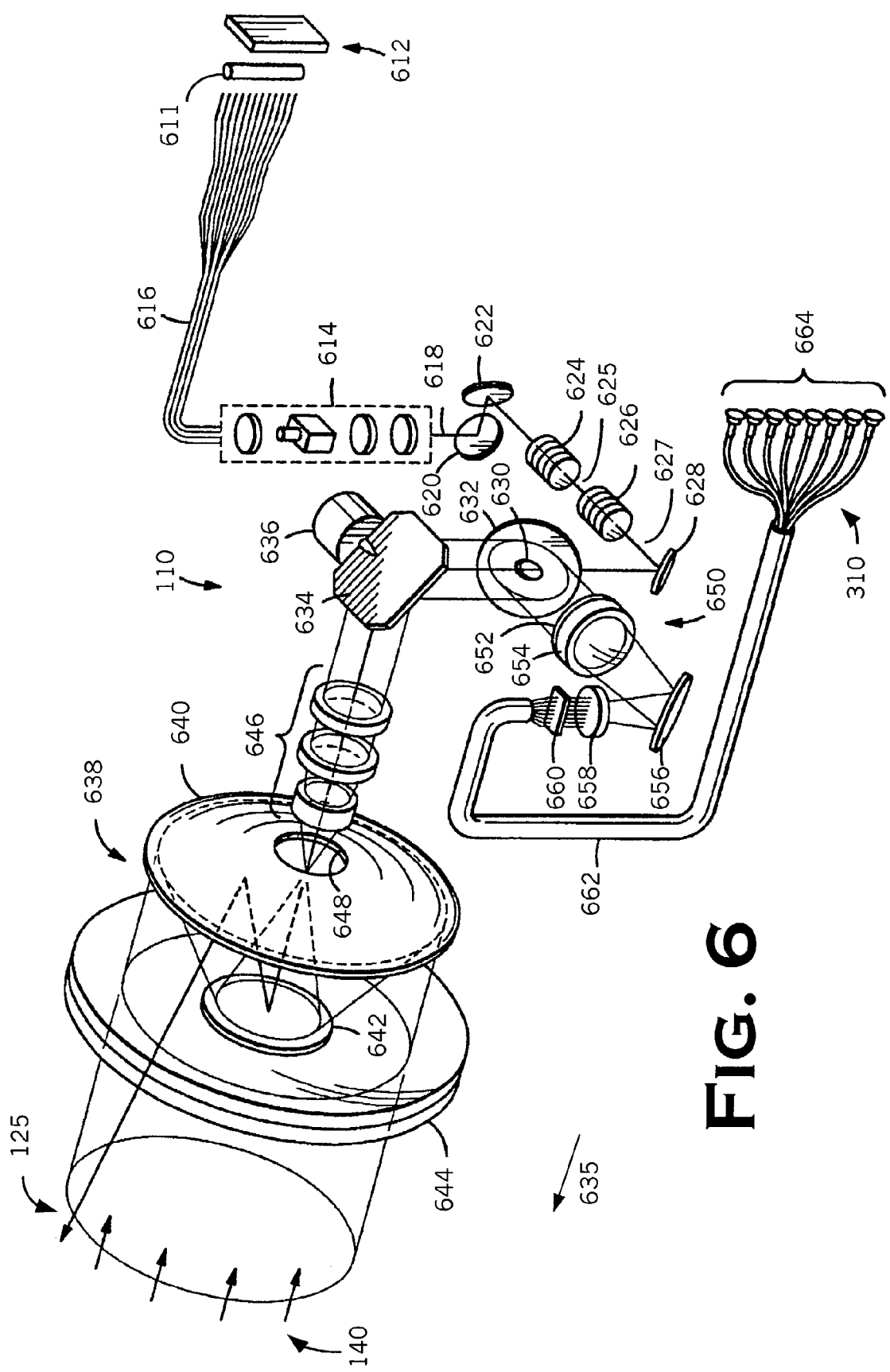
FIG. 6 is an exploded view of several components of an optical train that is the LADAR transceiver of the LADAR system of FIG. 1.
Figure 7:
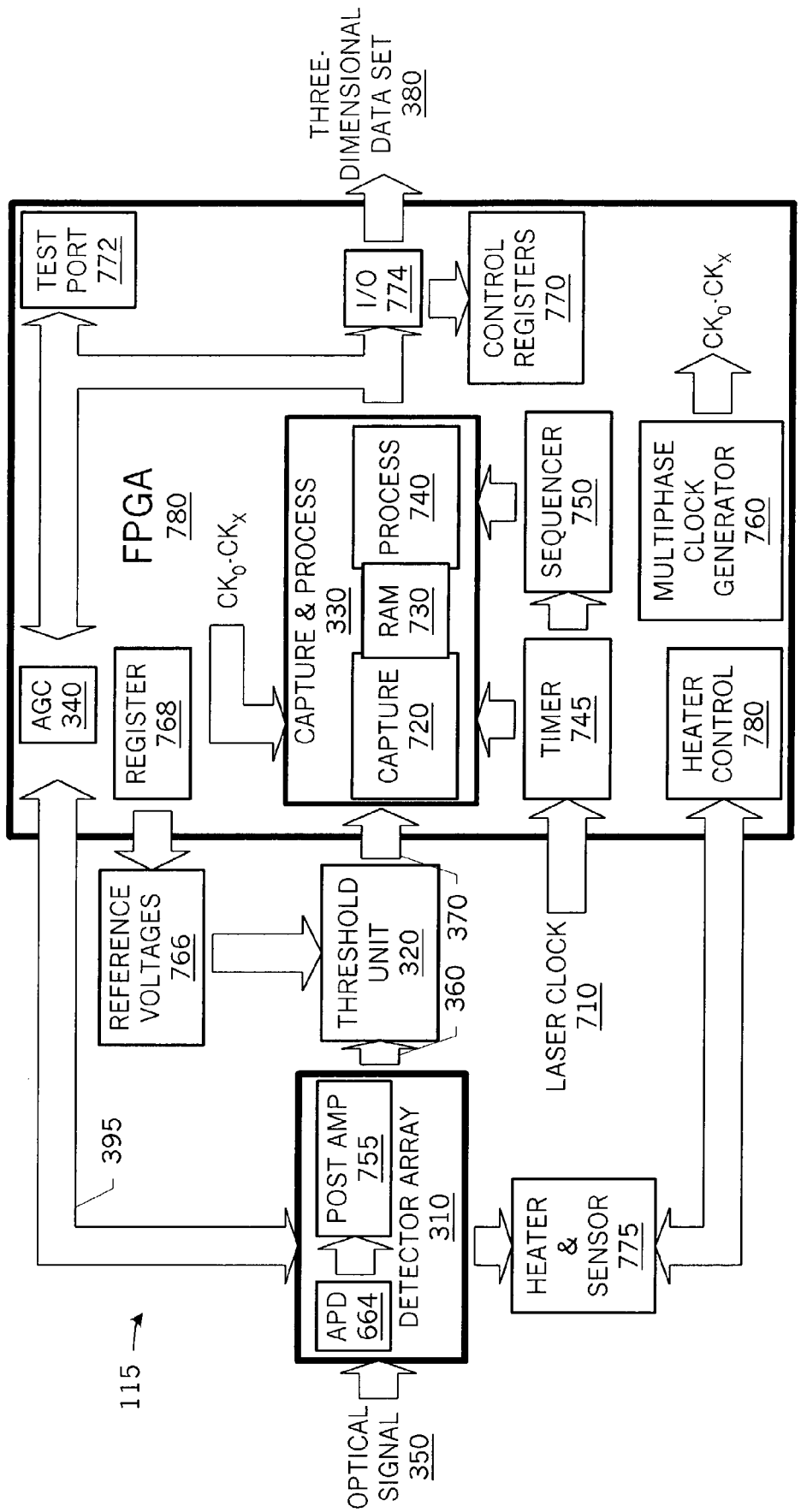
FIG. 7 is a block diagram of one particular embodiment of the pulse capture electronics of the LADAR system of FIG. 1.
Figure 8:
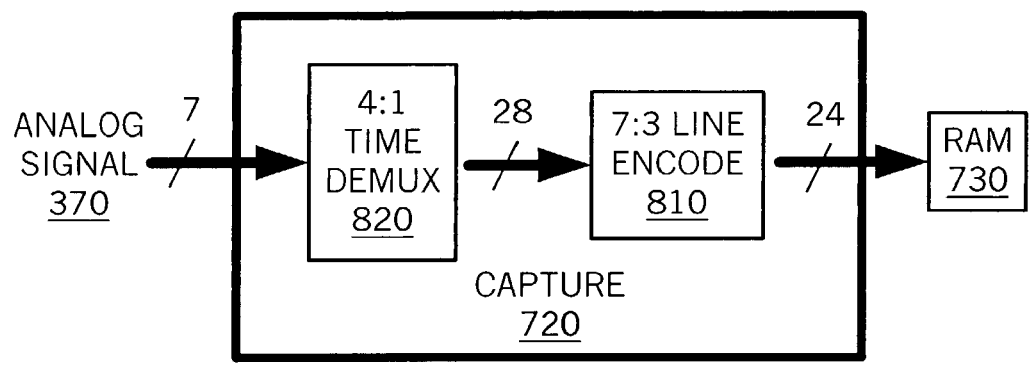
FIG. 8 is a block diagram of the capture unit of the pulse capture electronics shown in FIG. 7.
Figure 11:
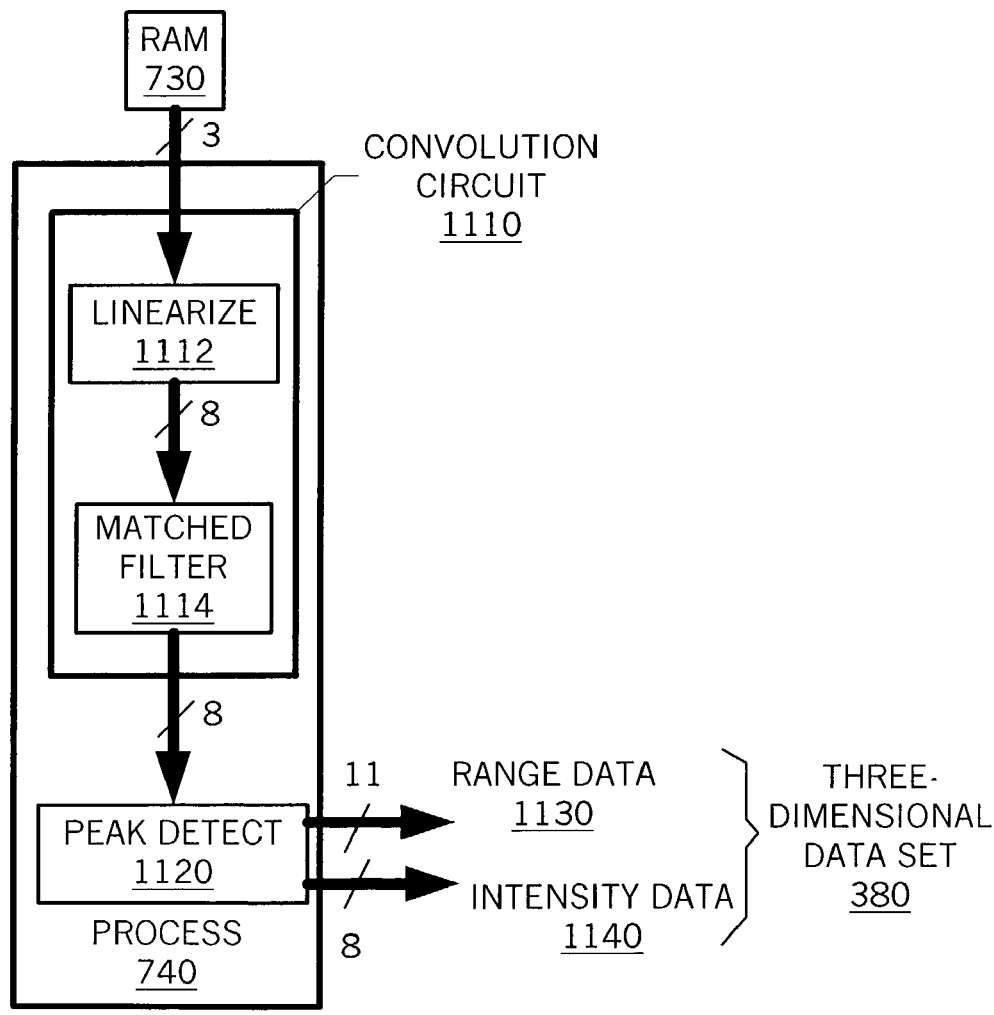
FIG. 11 is a block diagram on particular implementation of the process unit in FIG. 7.
Figure 9:
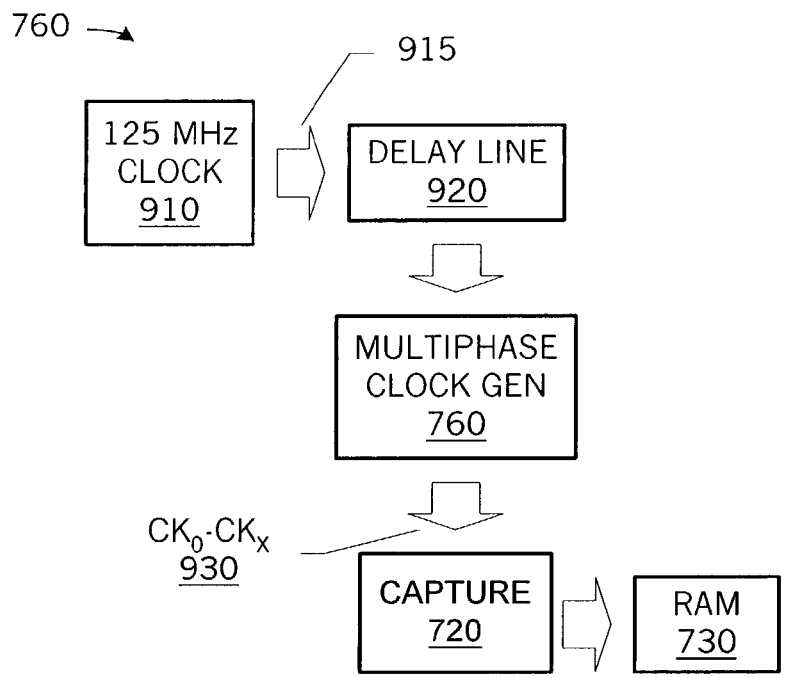
FIG. 9 and FIG. 10 are a block diagram and a timing diagram, respectively, illustrating the timing of sampling in the pulse capture electronics of FIG. 7.
Figure 10:
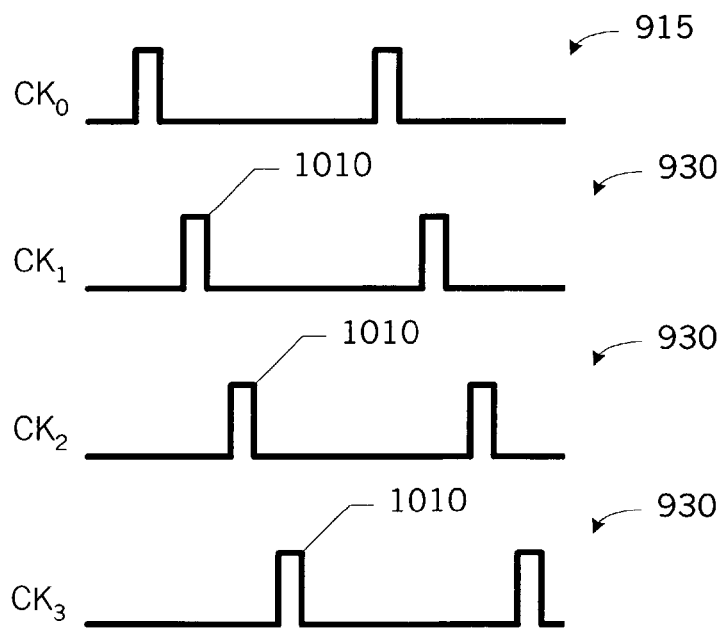
Figure 32:
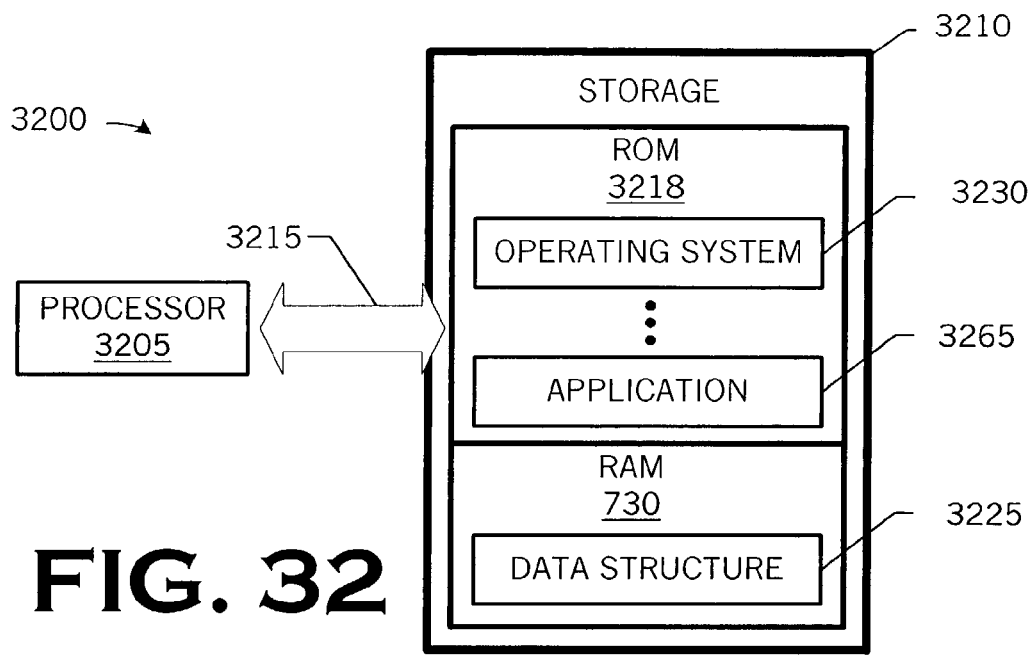
FIG. 32 is a block diagram of the electronics of the automatic target recognition system of the LADAR system of FIG. 1.
Figure 33:
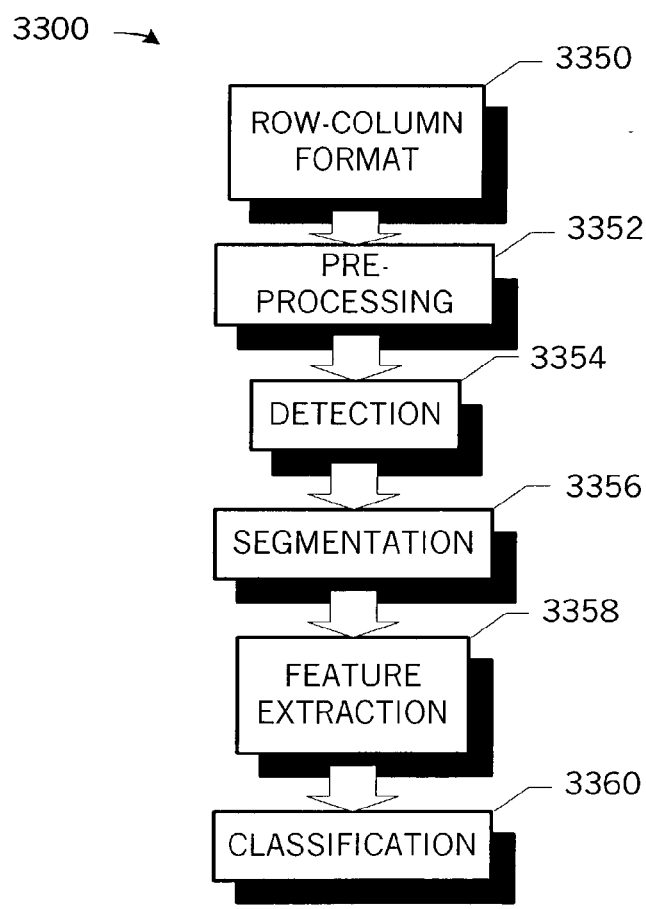
FIG. 33 illustrates the handling of three-dimensional data acquired by the pulse capture electronics, best shown in FIG. C, of the LADAR system of FIG. 1.

To further an understanding of the invention, one particular implementation of the LADAR system 100 shall now be discussed. In this discussion, for this particular implementation:

FIG. 6 illustrates the LADAR transceiver 110;
FIG. 7 illustrates the PCE 115, with FIG. 8 depicting the capture unit 720, FIG. 9 and FIG. 10 illustrating certain timing aspects of the PCE 115, and FIG. 11 depicting the process unit 740, and FIG. 12 to FIG. 31 depict various implementations of the process unit 740; and
FIG. 32 and FIG. 33 illustrate the ATR system 120.

Each of the LADAR transceiver 110, PCE 115, and ATR system 120 in this particular implementation shall now be discussed in turn.

FIG. 6 illustrates the LADAR transceiver 110 of FIG. 1. The LADAR transceiver 110 of the illustrated embodiment is disclosed in:

U.S. Pat. No. 5,200,606, entitled "Laser Radar Scanning System," issued Apr. 6, 1993, to LTV Missiles and Electronics Group as the assignee of the inventors Nicholas J. Krasutsky, et al.
U.S. Pat. No. 5,224,109, entitled "Laser Radar Transceiver," issued Jun. 29, 1993, to LTV Missiles and Electronics Group as the assignee of the inventors Nicholas J. Krasutsky, et al.; and
U.S. Pat. No. 5,285,461, entitled "Improved Laser Radar Transceiver," issued to Feb. 8, 1994, to Loral Vought Systems Corporation as assignee of the inventors Nicholas J. Krasutsky, et al.;

with some differences in operational parameters noted herein. However, alternative embodiments may employ any suitable LADAR transceiver known to the art. Indeed, some alternative embodiments may employ optical receivers without any optical transmission capability.

More particularly, FIG. 6 provides an exploded view of selected portions of the LADAR transceiver 110. A gallium aluminum arsenide laser (GaAlAs) 612 pumps a solid state laser 614, which emits the laser light energy employed for illuminating the target 130, shown in FIG. 1 and in FIG. 2. The pumping laser 612 produces a continuous signal of wavelengths suitable for pumping the solid state laser 614, e.g., in the crystal absorption bandwidth. The pumping laser 612 has an output power, suitable in the 10-20 watt range, sufficient to actuate the solid state laser 614. The solid state laser 614 is suitably a Neodymium doped yttrium aluminum garnet (YAG), a yttrium lithium fluoride (YLF), or a Yttrium Vanadate ($YVO_4$) laser operable to produce pulses with widths of 10 to 20 nanoseconds, peak power levels of approximately 10 kilowatts, at repetition rates of 10-120 Khz. The equivalent average power is in the range of 1 to 4 watts. The preferred range of wavelengths of the output radiation is in the near infrared range, e.g., 1.047 or 1.064 microns.

Output signals (not shown) from the pumping laser 612 are transmitted through an input lens 611 and through a fiber optic bundle 616 which has sufficient flexibility to permit scanning movement of the seeker head 110 during operation. The output beam 618 generated by solid state laser 614, in the present embodiment, is successively reflected from a first and a second turning, or folding, mirror 620 and 622 to a beam expander 624. The beam expander 624 comprises a series of (negative and positive) lenses adapted to expand the diameter of the beam 618 to provide an expanded beam 625, suitably by an 8:1 ratio, while decreasing the divergence of the beam 618 to the expanded beam 625.

The expanded beam 625 is next passed through a beam segmenter 626 for dividing the expanded beam 625 into a plurality of beam segments 627, conceptually represented by a single beam segment 627. The beam segments 627 are arrayed on a common plane, initially overlapping, and diverging in a fan shaped array. The beam segmenter 626 preferably segments the beam into 8 separate but overlapping beam segments 627. The divergence of the segmented beams 627 is not so great as to produce separation of the beams within the optical system, but preferably is sufficiently great to provide a small degree of separation at the target, as the fan-shaped beam array is scanned back and forth over the target.

The segmented beams 627 are then reflected from a third turning mirror 628, passed through a central aperture 630 of an apertured mirror 632, and subsequently reflected from a scanning mirror 634. The segmented beams 627 are reflected from the scanning mirror 634 in a forward direction relative to the LADAR system 100, represented by the arrow 635. The scanning mirror 634 is pivotally driven by a scanning drive motor 636 operable to cyclically scan the array of beam segments 627 for scanning the field of view 135, shown in FIG. 1 and in FIG. 2. The array of beam segments 627 is preferably scanned across the field of view at a rate of approximately 100 Hz. The turning axis of the scanning drive motor 636 is aligned in parallel with the segmenter wedges of the beam segmenter 626 whereby the resultant array of beam segments 627 is scanned perpendicularly to the plane in which the beam segments 627 are aligned.

An a focal, Cassigrainian telescope 638 further expands and directs the emitted beam. The telescope 638 includes a forwardly facing primary mirror 640 and a rearwardly facing secondary mirror 642. A protective outer dome 644 of a suitable transparent plastic or glass is mounted forward of the secondary mirror 642. A lens structure 646 is mounted in coaxial alignment between the primary mirror 640 and the scanning mirror 634, and an aperture 648 is formed centrally through the primary mirror 640 in alignment with the lens structure 646.

The transmitted beam segments 627 reflected from the scanning mirror 634 are directed through the lens structure 46 for beam shaping, directed through the aperture 648 formed centrally through the primary mirror 640, reflected from the secondary mirror 42 spaced forwardly of the primary mirror 640, and then reflected off the primary mirror 640 and out through the transparent dome 644. The resultant emitted pulse 125 is a fan shaped array scanned about an axis parallel to its plane. The beam segments 627 of the emitted pulse 125 are in side-by-side orientation mutually spaced by a center-to-center distance of twice their diameters.

The emitted pulse 125 is reflected as described above relative to FIG. 1 and FIG. 2 back to the LADAR transceiver 110, which receives the return pulse 140. Returning to FIG. 6, the return pulse 140 is received by the telescope 638, and reflected successively by the primary mirror 640 and the secondary mirror 642, the lens assembly 646, and the scanning mirror 634, toward the apertured mirror 632. Because the return pulse 140 is of substantially larger cross-sectional area than the emitted pulse 125, it strikes substantially the entire reflecting surface of the apertured mirror 632, and substantially all of its energy is thus reflected laterally by the apertured mirror 632 toward collection optics 650. The collection optics 650 include a narrow band filter 652, for filtering out wave lengths of light above and below a desired laser wavelength to reduce background interference from ambient light. Note that the return pulse 140 comprises multiple beam segments 627 just as does the emitted pulse 125.

The collected return pulse 140 then passes through condensing optics 654 for focusing the collected return pulse 140, and then a fourth turning mirror 656 re-directs the collected return pulse 140 toward a focusing lens structure 658 adapted to focus the collected return pulse 140 upon the receiving ends 660 of a light collection fiber optic bundle 662. The opposite ends of each optical fiber 662 are connected to illuminate diodes 664 in the detector array 310. Note that the detector array 310 actually comprises a portion of the PCE 115, but is presented in this discussion of the LADAR transceiver 110 for clarity.

The detector array 310 converts the laser light signals of the collected return pulse 140 to electrical signals that are conducted to the remainder of the PCE 115, first shown in FIG. 1, as is discussed more fully below. The fiber optic bundle 662 includes nine fibers, eight of which are used for respectively receiving laser light corresponding to respective transmitted beam segments 627 and one of which views scattered light from the transmitted pulse to provide a timing start pulse. The light received by the ninth fiber is transmitted to one of the diodes 664 of the detector array. The input ends 660 of the fibers 662 are mounted in linear alignment along an axis which is perpendicular to the optical axis. The respective voltage outputs of the detectors 664 thus correspond to the intensity of the laser radiation reflected from mutually parallel linear segments of the field of view 135 shown in FIG. 1 and FIG. 2, which is parallel to the direction of scan.

One particular implementation of the LADAR transceiver 110 splits a single 0.2 mRad 1/e2 laser pulse into septets with a laser beam divergence for each spot of 0.2 mRad with beam separations of 0.4 mRad. The fiber optical array 310, shown in FIG. 6, includes the fibers 662, which have an acceptance angle of 0.3 mRad and a spacing between the fibers 662 that matches the 0.4 mRad far field beam separation. The beam segments 627 are vertically spread by 0.4 mRad as it produces the vertical scan angle.

Note that alternative embodiments may employ LADAR transceivers other than the LADAR transceiver 110 discussed above. Other suitable transceivers include those disclosed in, inter alia, the following patents:

U.S. Pat. No. 4,515,471, entitled "Scanning Laser Radar," issued May 7, 1985, to LTV Aerospace and Defense Company as the assignee of the inventor Dayton D. Eden;

U.S. Pat. No. 4,515,472, entitled "Agile Receiver for a Scanning Laser Radar," issued May 7, 1985, to LTV Aerospace and Defense Company as the assignee of the inventor Albert B. Welch;

U.S. Pat. No. 4,528,525, entitled "Scanning Laser for a Scanning Laser Radar," issued Jul. 9, 1985, to LTV Aerospace and Defense Company as the assignee of the inventors Dayton D. Eden et al.;

Alternative embodiments might employ other techniques to provide additional capabilities, such as that disclosed in:

U.S. Pat. No. 6,262,800, entitled "Dual mode semi-active laser/laser radar seeker," issued Jul. 17, 2001, to Lockheed Martin Corporation as the assignee of the inventor Lewis G. Minor;

Some alternative embodiments may also incorporate additional techniques to improve the quality or resolution of the data that can be obtained from the return pulse 140. Such techniques are disclosed in, inter alia, the following patents:

U.S. Pat. No. 5,701,326, entitled "Laser Scanning System With Optical Transmit/Reflect Mirror Having Reduced Received Signal Loss," issued Dec. 23, 1997, to Loral Vought Systems Corporation as the assignee of the inventor Edward Max Flowers;

U.S. Pat. No. 5,285,461, entitled "Method for Increasing Single-Pulse Range Resolution," issued Feb. 8, 1994, to Loral Vought Systems Corporation as the assignee of the inventors Nicholas J. Krasutsky, et al.

U.S. Pat. No. 5,898,483, entitled "Method for Increasing LADAR Resolution," issued Apr. 27, 1999, to Lockheed Martin Corporation as the assignee of the inventor Edward Max Flowers;

U.S. Pat. No. 6,115,113, entitled "Method for Increasing Single-Pulse Range Resolution," issued Sep. 5, 2000, to Lockheed Martin Corporation as the assignee of the inventors Stewart W. Flockencier.

Thus, practically any LADAR transceiver known to the art may be employed to implement the present invention. Some embodiments may also employ additional techniques for acquiring other kinds of data to enhance application of the three-dimensional data set 380 to its end use.

FIG. 7 conceptually illustrates, in a block diagram, one particular embodiment 700 of the PCE 115 of the LADAR system 100 of FIG. 1. The PCE 115 initiate the firing of the laser transmitter in the LADAR transceiver 110 and determine the time-of-flight (range) and intensity of the return pulses collected by the LADAR transceiver 110. A matched filter technique extracts the range and intensity information from the data stream generated from the collected return pulse 140. This process produces accurate data under low signal-to-noise conditions and with widely varying reflectivity returns, and can isolate secondary returns from interference such as from under trees or behind camouflage nets. The PCE 115 output the results of the analysis, a three-dimensional data set 380, to the ATR system 120 for execution of the targeting algorithms.

More particularly, from the standpoint of the invention, the collected return pulse 670 is digitized and stored and a detailed analysis that utilizes many time samples is performed. This analysis "slides" a template across the stored sequence of samples to find the best match. The location of this best match is proportional to the range of the captured pulse while the strength of the match is related to its intensity. The template averages or convolves many samples together to improve the signal to noise ratio and to find the center of the return pulse. Using this method, signal amplitude variations may be ignored. An appropriate template can also be used for second-pulse logic to extract secondary returns even if the later pulse is partially overlapped by a stronger primary return. This analysis yields a data set representing the shape of the returned pulse 140. This shape is compared to that of the emitted pulse 120 to determine flight time of the pulses 120, 140 to and from the target. This method avoids certain limitations experienced in prior-art, analog edge detection systems relating to power, range, or frequency considerations.

Returning to FIG. 7, the PCE 115 receives the optical signal 350, first shown in FIG. 3, and the laser clock 710 (i.e., the clock that controls the timing of the laser pulse emission) from the LADAR transceiver 110. The discussion relative to FIG. 6 set forth above assumes that the LADAR transceiver 110 is collecting returned pulses 140 upon the reflection of a transmitted pulse 125. However, as is apparent from the discussion relative to FIG. 3 above, the LADAR transceiver 110 collects information transmitted to the detector array 310 other than returned pulses 140. Indeed, the LADAR transceiver continuously collected information that is output to the PCE 115 as the optical signal 350.

Still referring to FIG. 7, the PCE 115 processes the received optical signal 350 and outputs a three-dimensional data set 380. The PCE 115, in accordance with various aspects of the present invention, include the detector array 310, a threshold unit 320, a capture unit 720, a random access memory ("RAM") 730, a process unit 740, an automatic gain control ("AGC") 340, and a multiphase clock generator 760. In the course of processing the optical signal 350, the PCE 115 controls the gain of the detector array 310 through the AGC 340 as was discussed relative to FIG. 5A above.

As previously mentioned, the detector array 310 comprises a plurality of photodiodes 664. In the illustrated embodiment, the photodiodes 664 are avalanche photodiodes ("APD"). However, as will be appreciated by those in the art having the benefit of this disclosure, a wide variety of detector technologies may instead be employed to implement the detector array 310. Any such suitable detector technology may be employed, and the invention is not limited by this aspect of the implementation. The optical signals collected by the photodiodes 664 are then amplified by the post-amplifiers 765 and output to the threshold unit 320.

The threshold unit 320 converts the analog, collected return pulse 140 signal to a digital signal using a 1 GHz flash converter process. A bank of voltage comparators (not shown) is employed, and comparison is accomplished by first converting each pulse signal to a string of digital signals. Each portion of the collected return pulse 140 equals the instantaneous amplitude of the signal received at that moment. In the illustrated embodiment, the threshold unit 320 employs a comparison circuit (not shown) comprising seven individual, nonlinear comparators (not shown). The comparators are preferably flash converters ganged together and spaced apart in their threshold in a logarithmic function, between 30 mV and 1 V, based on expected return. The collected return pulse 140 is fed to all seven comparators at once, but each has a different reference voltage 766, and levels being spaced in logarithmic intervals over the expected voltage range. Starting at the lower level, all the analog comparators with digital outputs operate like an operable amplifier with no feedback. At every clock, the highest comparator turns on. The threshold unit 320 outputs the resultant continuous digital representation 370 of the optical signal 350.

Note that more than seven comparators can be used to increase the amplitude resolution and reduce the effects of sampling jitter and noise. Note further that the values of the reference voltages 766 for the multi-level comparison by the threshold unit 320 are set by predetermined values stored in the register 768. However, this is only one approach to setting these values. For instance, the values could be stored in the control registers 770, or even the RAM 730. The control registers 770 are used to store operational parametrics. These values may be loaded prior to use of the LADAR system 100 through the test port 772, but, again, alternative techniques may be employed.

The capture and process unit 330 includes the capture unit 720, RAM 730, and process unit 740 capture the collected return pulse 140 and process it. The capture unit 720 samples the digitized representation of the collected return pulse 740 output by the threshold unit 320 at 500 MHz. The capture unit 720 converts the sampled signal 370 into a 3-bit word (or, "thermometer code") proportional to the peak of the collected return pulse 140, and stores the coded samples in the RAM 730. The process unit 740 then performs the detailed analysis mentioned above on the data samples stored in the RAM 730. The result of this analysis is output to the input/output ("I/O") unit 774, which conditions the results to produce and output the three-dimensional data 380.

The capture unit 720 comprises a gate array and is better shown in FIG. 8. As shown in FIG. 8, the threshold unit 320 feeds the digital signal 370 to the capture unit 720. The capture unit 720 has three functions: to sample the input waveform at 500 MHz, convert the sample into the 3-bit thermometer code proportional to the peak of the input signal in an encoder 810, and to time de-multiplex the signal to 125 MHz compatible with the RAM 730.

A 4:1 time demultiplexer 820 is provided which, in operation, allows eight nanoseconds for the encoding of a signal. From the capture unit 720, four three-bit samples are then stored in the RAM 730. Thus, the capture unit 720 samples the status or state of the bank of comparators in the threshold unit 320 every two nanoseconds to determine how many of the comparators are turned on, assigns a digital word (0, 1, 2 through 7) indicating that determination, and stores the digital word in the RAM 730.

In the illustrated embodiment, the capture unit 720, as well as some other aspects of the PCE 115, is implemented in a field programmable gate array ("FPGA") 780. Current FPGA technology is not capable of operating at 1 GHz frequencies, unlike the emitter-coupled logic ("ECL") of the prior art. Thus, the illustrated embodiment employs a multiphase clock generator 760 that generates a multiphase clock signal from an input clock signal, each phase of which is used to by the capture unit 720 to time a respective sampling. The illustrated embodiment uses this multiphase clock technique to sample digitized, collected return pulse 140 at a rate effectively higher than the basic FPGA clock rate of 125 MHz.

Consider, for instance, the particular implementation shown in FIG. 9 and FIG. 10. In this particular implementation, the FGPA 780 in which the capture unit 720 is implemented operates on a nominal 125 MHz clock 910. The 125 MHz clock signal 915 from the 125 MHz clock 910 is input to the multiphase clock generator 760 through a delay line 920. The delay line 920 imposes a 2 ns delay. The multiphase clock generator 760 then generates the four-phase clock signal 930, each phase separated by 2 ns. Each phase 1010 of the four-phase clock signal 930 drives a sampling cycle such that the capture unit 720 is sampling at a 500 MHz rate. The capture unit 720 is sampling as though driven by four time-multiplexed 125 MHz clocks. The samples are stored in the RAM 730 when acquired, and thus are also stored in a time-multiplexed fashion. Consequently, the stored samples in the RAM 730, when read out by the process unit 740, appear as if they had been sampled at 500 MHz by a single, 500 MHz clock signal. Similarly, a 125 MHz eight-phase system would achieve an effective 1 GHz sampling rate. In addition, an increase in chip performance would allow an increase in effective sampling rate or reduction in the number of phases.

Returning to FIG. 7, the process unit 740 then reads the samples from the RAM 730 and processes them into the three-dimensional data set 380 using the matched filter technique mentioned above. The process unit 740 comprises, as is shown in FIG. 11, a convolution circuit 1110 and a peak detect circuit 1120. The convolution circuit 1110 analyzes the samples using a matched filter and delivers the result of the analysis to the peak detect circuit 1120. The peak detector circuit 1120 identifies the peak of the convolved results, which correlates to the arrival time of the return pulse 140. This process may extract higher resolution results by use of the D-A procedure described below. The peak detector circuit 1120 delivers the range data 1130 and intensity data 1140 for the return pulse 140, which comprise the three-dimensional data set 380.

The convolution circuit 1110 includes a matched filter 1112 and, in some embodiments, the optional linearize circuit 1114. The linearize circuit 1114 strips out the non-linearity introduced by the non-linear threshold unit 320. The matched filter 1112 may be any FIR filter known to the art. The matched filter 1112 is loaded with a set of coefficients representative of the expected shape of the return pulse 140. This set of coefficients defines the template discussed above. The convolution circuit 1110 produces evaluation numbers indicative of the degree of correlation between the template and the return pulse 140.

The design of convolution circuits, e.g., the convolution circuit 1110, is well-known in the art. Conventional convolution circuits feed the samples serially into the filter thereof, each sample being fed one at a time. In this conventional approach, the template is shifted across the stored sequence in discrete steps defined by the sampling rate at which the analog return pulse is digitized. Each discrete step is no wider or narrower than an individual sample and the resolution of any measurement obtained therefrom is determined by the sampling rate in the analog-to-digital conversion.

In one particular embodiment, the convolution circuit 1110 effectively improves the sampling rate at which the return pulse is digitized. The convolution circuit 1110 does so by "interpolating" between samples. For an R:1 interpolation, where R>1, each sample is clocked out of the buffer 222 and into the convolution circuit 1110 R times before clocking out the next sample so that each sample is fed into the convolution R times.

Thus, the convolution circuit 1110 repeatedly convolves each one of at least a portion of the buffered samples R times, wherein R>1. This convolution technique may also be conceptualized as shifting the template in steps smaller than the input samples such that a correlation determination can be made at points in between the discrete samples. This convolution technique therefore produces an effective sampling rate potentially much higher than the actual sampling rate without directly impacting the data acquisition. Consequently, the resolution of the range extracted therefrom is improved by a factor of R.

The peak detect circuit 1120 processes the evaluation numbers from the convolution circuit 1110 to determine the point in time where a "best match" occurs between the return pulse and the template. "Best match" is defined, in this context, as the set of samples among those filtered whose correlation with the template is highest. By identifying the portion of the sampled return signal that best matches the stored template, the peak detect circuit 1120 effectively determines the time at which the return pulse 140 was received.

Thus, the peak detect circuit 1120 detects the center of energy for the return pulse 140 from the convolution results output by the convolution circuit 1110. Technically, as those in the art having the benefit of this disclosure will appreciate, the peak detect circuit 1120 detects the peak of the processed, digitized samples, which theoretically represents the peak of the return signal 1120. However, in practice, this is not always the case as the data may be corrupted or polluted. Thus, the peak of the processed samples indicates the return pulse's center of energy, from which the time at which the pulse was received may be more accurately determined.

As noted above, any convolution circuit including a matched filter known to the art can be employed to perform the convolution of the samples with the template, provided it is modified to clock each sample R times to perform an R:1 interpolation. That is, any convolution circuit known to the art may be used to implement the convolution circuit 1110. However, in the interest of completeness, two implementations for the convolution circuit 1110 are disclosed. FIG. 12 to FIG. 16 illustrate a first implementation and a second convolution circuit employing a processing technique reducing the amount of hardware needed to implement it is illustrated in FIG. 17 to FIG. 31. Both of these convolution circuits are also disclosed in:

- U.S. Pat. No. 6,115,1113, entitled "Method for Increasing Single-Pulse Range Resolution," issued Sep. 5, 2000, to Lockheed Martin Corporation as the assignee of the inventor Stuart W. Flockencier ("the '113 patent"), which describes an over-sampling method for increasing range resolution; and
- U.S. Pat. No. 5,511,015, entitled "Double-Accumulator Implementation of the Convolution Function," issued Apr. 23, 1996, to Loral Vought Systems Corporation as the assignee of the inventor Stuart W. Flockencier, which describes a method for reducing FIR complexity and whose teachings were adapted to the over-sampling method in the '113 patent.

Both of these patents are commonly assigned herewith to what is now Lockheed Martin Corporation.

Figure 12:
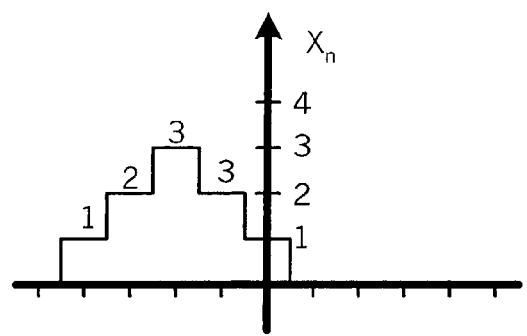
Figure 13:
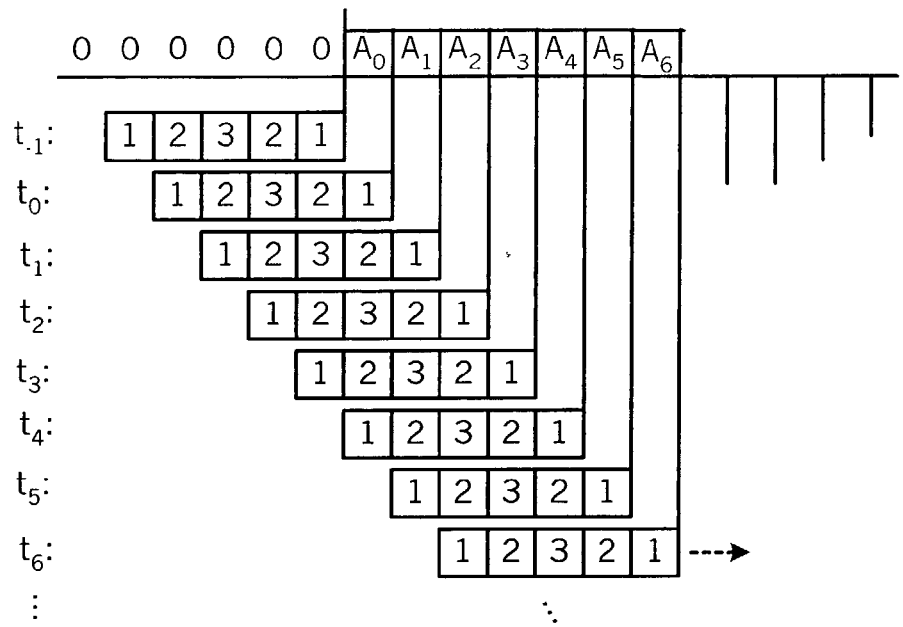

Turning now to the first implementation of the convolution circuit 1110, FIG. 12 graphs a filter coefficient stream ("FCS"), i.e., the coefficients defining the template to be matched. The coefficients are represented in the figures by the notation $A_t$, where the subscript "t" shows the relative position of the coefficient in the FCS in the time domain. Using Equation 1, set forth below, the convolution of this sample function is illustrated in FIG. 13 for times ($t_{-1}$, $t_0$, $t_1$, . . . $t_6$) for each of "n" samples.

$$C_{xy}(m) = \frac{1}{N}\sum_{K=0}^{N-1} x(k)y(m-k)$$

Figure 14:
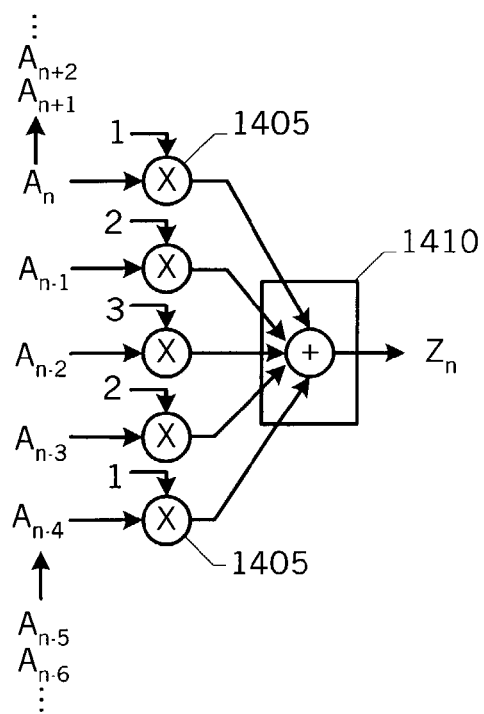

FIG. 14 shows a high-speed circuit approach for implementing this convolution, using five multipliers 1405 (only two indicated) arranged in parallel with a summation circuit 1410 providing the convolution results, depicted as $Z_n$. In practice, the summation circuit 1410 is implemented by several 2-input adders 1605, shown in FIG. 16 (only two indicated). Specifically a total of N-1 adders are employed in this implementation. The table shown in FIG. 15 illustrates the summation outputs as each of the samples is processed from the lowest-positioned of the multipliers to the highest-positioned of the multipliers, and assuming that $A_0$ is the first data sample having a non-zero value. Accordingly, for the convolution implementation shown in FIG. 14 to FIG. 16, four adders and five multiply operations are required for each output value of "n". Note that each sample is read R times, where R>1, before the next sample is read to implement an R:1 interpolation as was discussed above.

In the second implementation illustrated in FIG. 17 to FIG. 31, the convolution circuit 1110 uses a double-accumulator technique to reduce the number and complexity of multiply-and-add operations typically necessary per sample for the approach. The amount of reduction depends upon the shape of the filter function, i.e., the numerical relationship between adjacent coefficients. If the filter function is expressed as a series of "piece-wise linear" segments, then this double-accumulator technique reduces the number of necessary multiply-and-add operations. A sequence of coefficients are said to be piece-wise linear if each successive term represents a constant change in value from the previous term.

Figure 17:
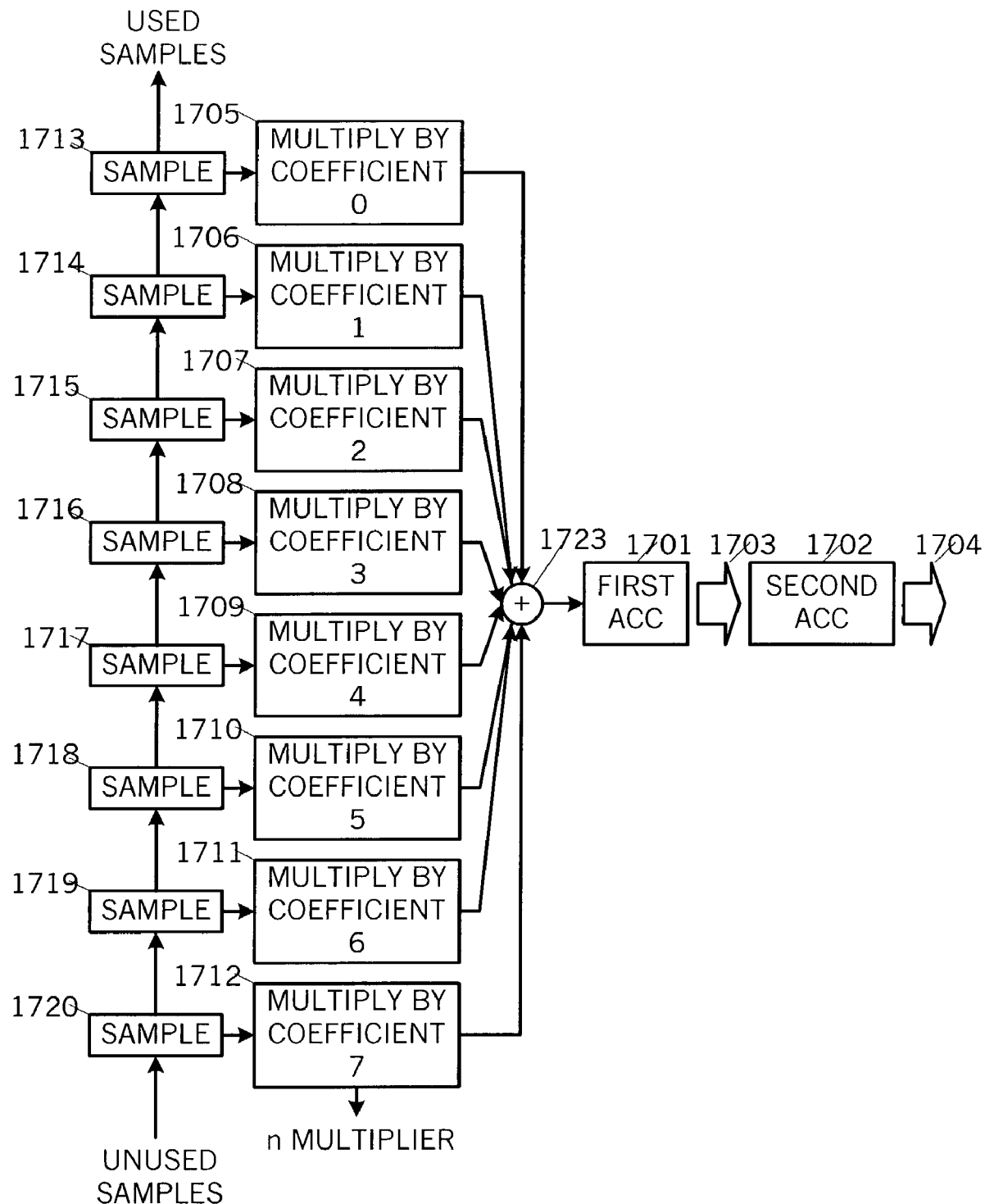

Turning now to FIG. 17, this embodiment of the matched filter includes first and second accumulators 1701, 1702 and a plurality of multipliers 1705-1712. Each of the multipliers 1705-1712 has an input and an output and each is configured to multiply a respective input data sample 1713-1720 by a derived D-A (double-accumulator) coefficient. The first accumulator 1701 receives the outputs of the multipliers 1705-1712 from a summer 1723. The second accumulator 1702 receives an output 1703 from the first accumulator 1701. In a more specific implementation, the matched filter further includes a shift register (not shown) for sequentially receiving input data samples 1713-1720 and for providing the input data samples 1713-1720 to the inputs of the multipliers.

Preferably, a double-accumulator is implemented using a set of D-A coefficients derived from the input filter coefficient stream ("FCS"), e.g., the FCS in FIG. 12. In most implementations, the D-A coefficients are obtained by taking the second derivative of the FCS, discussed further below relative to FIG. 17, FIG. 19, and FIG. 20. The second derivative operation, on the piece-wise linear coefficient stream, forces most of the D-A coefficients to zero. The remaining non-zero terms are "small" numbers compared to the original coefficients. Once ascertained, the non-zero D-A coefficients are used to weight the input data samples.

The weighting technique can be accomplished by multiplying each D-A coefficient by a separate input sample, as will be discussed relative to FIG. 17. Note that each sample is read R times, where R>1, before the next sample is read to implement an R:1 interpolation as was discussed above. The products are then summed together along with the result of a previous multiplication of the same D-A coefficients with different input data samples. This first sum is added to another number to form a second sum. The other number is the previous value of the second sum. The second sum is the result. The resultant output data stream is exactly the same as the method would compute.

Such a double-accumulator can be implemented in a variety of circuits. For example, a register-based double accumulator may be implemented using a shift register to sequentially move input data across the inputs to a plurality of multipliers. The multipliers are used to multiply the input data by selected D-A coefficients. The products are summed together and provided to a first accumulator. The first accumulator provides its output to the input of a second accumulator. The second accumulator provides the result.

This particular double accumulator implementation is, as discussed above, deployed in a RAM-based convolver. The RAM 730, shown in FIG. 7 and in FIG. 11, holds the data samples and D-A coefficients. An address generator (not shown) directs the RAM 730 to provide appropriate pairs of input data samples and D-A coefficients. These pairs are provided to a multiply-accumulator. The output of the multiply-accumulator is coupled to a accumulator. The output of the accumulator is the result. Note that other implementations may employ other types of memory that may buffer the data samples.

More particularly, a D-A convolver circuit is constructed from coefficients derived from the filter coefficient stream ("FCS"). These coefficients are referred to as "D-A coefficients." Referring to FIG. 12, an example of a FCS is shown plotted on a graph as the numerical series 1,2,3,2,1 formed from two piece-wise linear segments. This short series is chosen to keep the example simple and should not be viewed as a limit on the D-A method. Note that a similar sequence 1,2,3,4,5, . . . , 5,4,3,2,1 is also formed from two piece-wise linear segments and will yield the same number of non-zero D-A coefficients (three) regardless of the number of original terms. The approach would contain one multiplier-summer per each original term, not three as in the D-A method.

The D-A coefficients are preferably ascertained from the second derivative of the FCS. FIG. 17 graphs the first derivative of the FCS in FIG. 12. Generally, the first derivative is found by Equation 2:

$$X'_n = (\Delta x_n)/(\Delta t) = x_n - x_{n+1}$$

Figure 19:
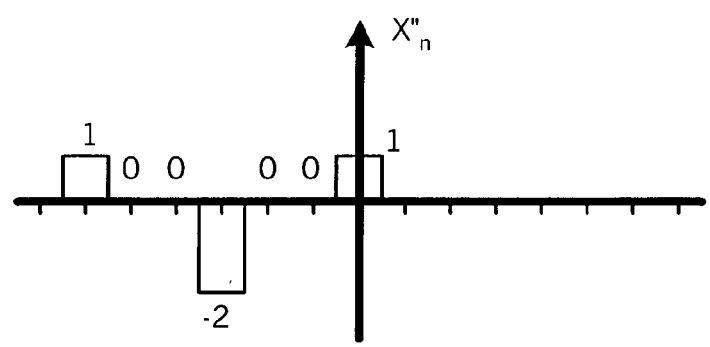

FIG. 19 graphs the second derivative of the FCS in FIG. 12. Generally, the second derivative can be found by equation (3):

$$X''_n = (\Delta x'_n)/(\Delta t') = x'_n - x'_{n+1}$$

Figure 20:
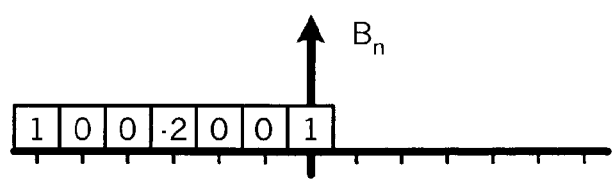

The resulting values are the D-A coefficients. FIG. 20 graphs the resulting D-A coefficients against the axis $B_n$. In the D-A circuitry, the input sample stream will be weighted, preferably multiplied, by these coefficients. Since most of the coefficients are zeros, the D-A circuitry requires only a few multipliers.

D-A coefficients are readily ascertained from most any function expressed as a series of line segments. One D-A coefficient is designated for each point where two line segments meet. The value of a D-A coefficient is equal to the change in slope (second derivative) from the first line segment to the second. Examples of this method are shown in FIG. 21 to FIG. 23.

Figure 21:
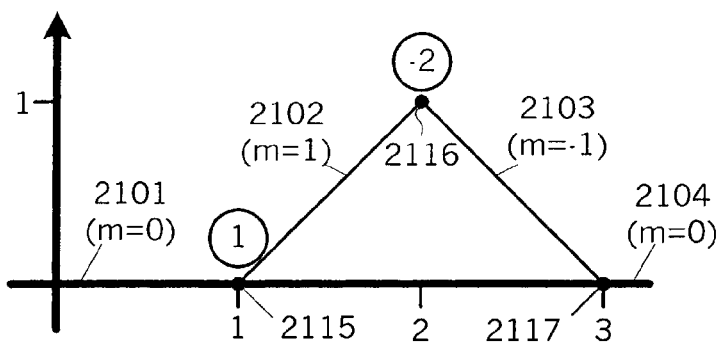

Referring first to FIG. 21, all line segment slopes are indicated by "m=" and all D-A coefficients are circled. Specifically, FIG. 21 shows line segment 2101 with slope m=0 adjoining to line segment 2102 having slope m=1. Therefore, the D-A coefficient at point 2115 is "1" (1–0). FIG. 21 also shows line segment 2102 with slope m=1 adjoining to line segment 2103 having slope m=–1. Therefore, the D-A coefficient at point 2116 is "–2" ((–1)–1). In addition, FIG. 21 shows line segment 2103 with slope m=–1 adjoining to line segment 2104 having slope m=0. Therefore, the D-A coefficient at point 2117 is "1" (0–(–1)).

Figure 22:
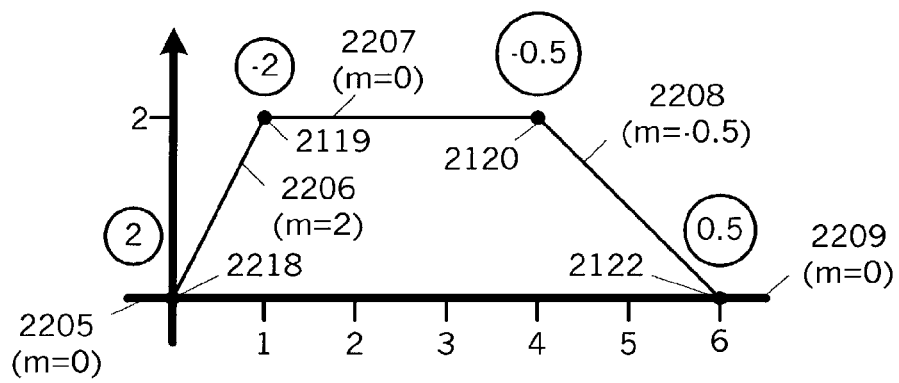

FIG. 22 shows line segment 2205 with slope m=0 adjoining to line segment 2206 having slope m=2. Therefore, the D-A coefficient at point 2218 is "2" (2–0). FIG. 22 also shows line segment 2206 with slope m=2 adjoining to line segment 2207 having slope m=0. Therefore, the D-A coefficient at point 2219 is "–2" (0–2). In addition, FIG. 22 shows line segment 2207 with slope m=0 adjoining to line segment 2208 having slope m=(–0.5). Therefore, the D-A coefficient at point 2220 is "–0.5" ((–0.5)–0). FIG. 22 shows line segment 2208 with slope m=(–0.5) adjoining to line segment 2209 having slope m=0. Therefore, the D-A coefficient at point 2222 is "0.5" (0–(–0.5)).

Figure 23:
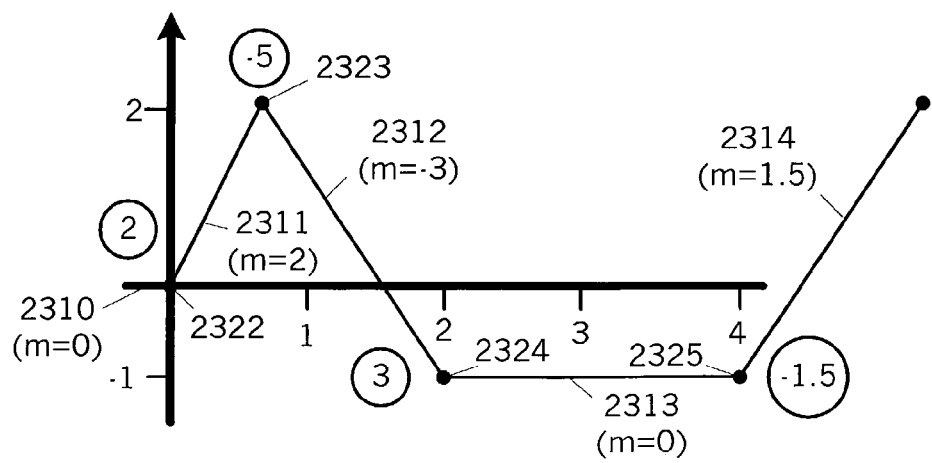

FIG. 23 shows line segment 2310 with slope m=0 adjoining to line segment 2311 having slope m=2. Therefore, the D-A coefficient at point 2318 is "2" (2–0). FIG. 23 also shows line segment 2311 with slope m=2 adjoining to line segment 2312 having slope m=(–3). Therefore, the D-A coefficient at point 2323 is "–5" ((–3)–2). In addition, FIG. 23 shows line segment 2312 with slope m=(–3) adjoining to line segment 2313 having slope m=0. Therefore, the D-A coefficient at point 2324 is "3" (0–(–3)). Lastly, FIG. 23 shows line segment 2313 with slope m=32 (0) adjoining to line segment 2314 having slope m=1.5. Therefore, the D-A coefficient at point 2325 is "1.5" (1.5–0).

Returning to FIG. 17, the multipliers 1705-1712 multiply input sample values by the ascertained D-A coefficient values. Depending upon the FCS, more or less multipliers may be used. The products from the multipliers 1705-1712 are added together by adder 1723. The sum is fed to the first accumulator 1701, which accumulates a running summation of sequential outputs from the adder 1723 as each sample is processed. The result 1703 from the first accumulator 1701 is fed to the second accumulator 1702, which accumulates a running summation of sequential outputs from the accumulator 1701 as each sample is processed. The result from the second accumulator 1702 is the result of the convolution (or the filtered signal value) 1704. Using the example from FIG. 17 and FIG. 18, the circuitry would require only three multipliers because five of the D-A coefficients are zeros, as shown in FIG. 20.

Figure 24:
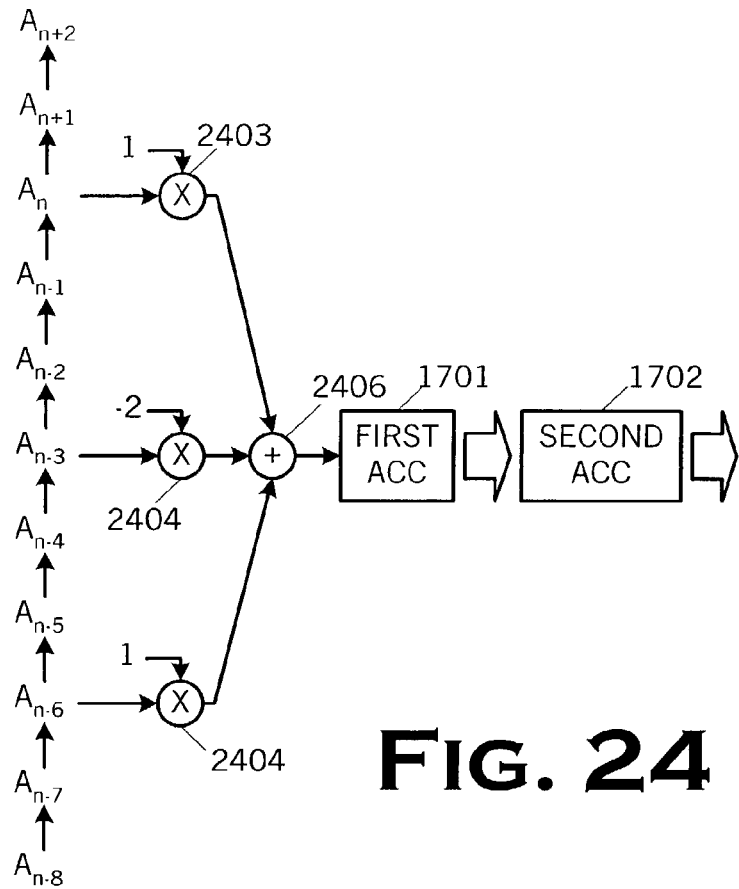

FIG. 24 illustrates a more tailored example of the circuit in FIG. 17. The input values (samples) are designated by "$A_{n-1}$", or similar notations. These samples are multiplied by D-A coefficients in multipliers 2403, 2404, and 2405. The multipliers 2403-2405 feed a summer 2406 which sums the three products. The summer feeds the first accumulator 1701. The first accumulator 1701 feeds the second accumulator 1702. The second accumulator 1702 yields the result of the convolution (or a filtered signal). The first accumulator 1701 and the second accumulator 1702 operate in the same manner as described in connection with the accumulator 1701 and 1702 of FIG. 17.

Still referring to FIG. 24, the input values (samples, $A_{n-t}$) are weighted (multiplied) by the non-zero D-A coefficients from FIG. 20. Specifically, sample $A_{n-6}$ represents the most-recently input data sample and is fed into a multiplier 2403 to be multiplied by the D-A coefficient "1", which corresponds to the right most D-A coefficient "1" in FIG. 20. $A_{n-3}$ is a sample taken three samples before $A_{n-6}$. $A_{n-3}$ is fed into multiplier 2404 to be multiplied by the D-A coefficient "–2"; this "–2" corresponds to the "–2" D-A coefficient from FIG. 20. $A_n$ is a sample taken 6 samples before sample $A_{n-6}$. An is fed into multiplier 2405 to be multiplied by the D-A coefficient "1" this "1" corresponds to the left most D-A coefficient in FIG. 20. The two sample spaces between $A_n$ and $A_{n-3}$ correspond to the two "0" spaces between D-A coefficients "1" and "–2" in FIG. 20. Similarly, the two sample spaces between $A_{n-3}$ and $A_{n-6}$ correspond to the two "0" spaces between D-A coefficients "–2" and "1" in FIG. 20.

Figures 25, 28:
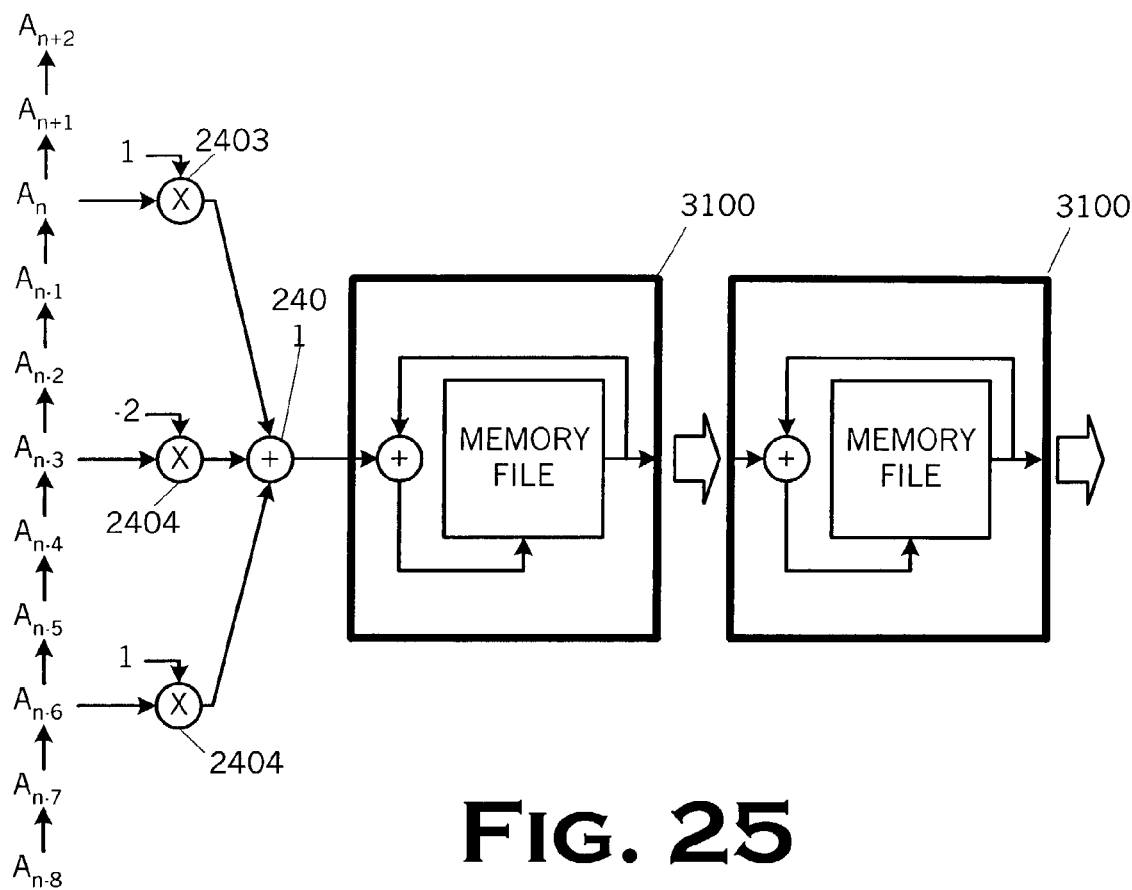

FIG. 31 shows the circuitry comprising an accumulator 3100 (e.g. the accumulators 1701, 1702 of FIG. 17, FIG. 24). The input to the accumulator 3100 enters a summer 3105. The output of the summer 3105 is stored in a memory file 3110. The memory file 3110 may comprise nearly any re-writable memory mechanism such as a DRAM, a register file, flip-flops, latches, etc. The output of the memory file 3110 provides the second input to the summer 3105 via line 3115 and provides the output of the accumulator 3100. FIG. 25 shows the D-A circuit of FIG. 24 implementing the accumulators 1701, 1702 with the accumulator 3100 of FIG. 31. Alternatively, the summers 2401 and 3105 may be consolidated as shown in FIG. 26.

Figure 18:
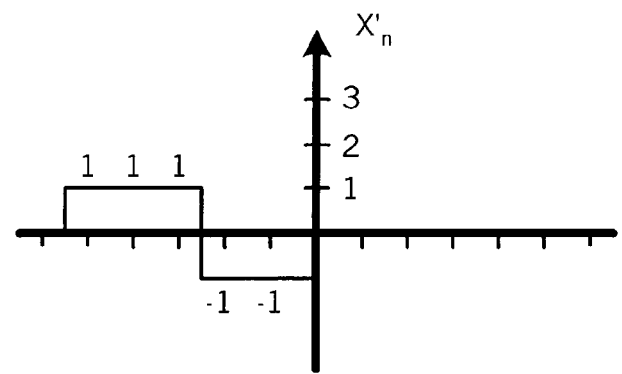
Figure 26:
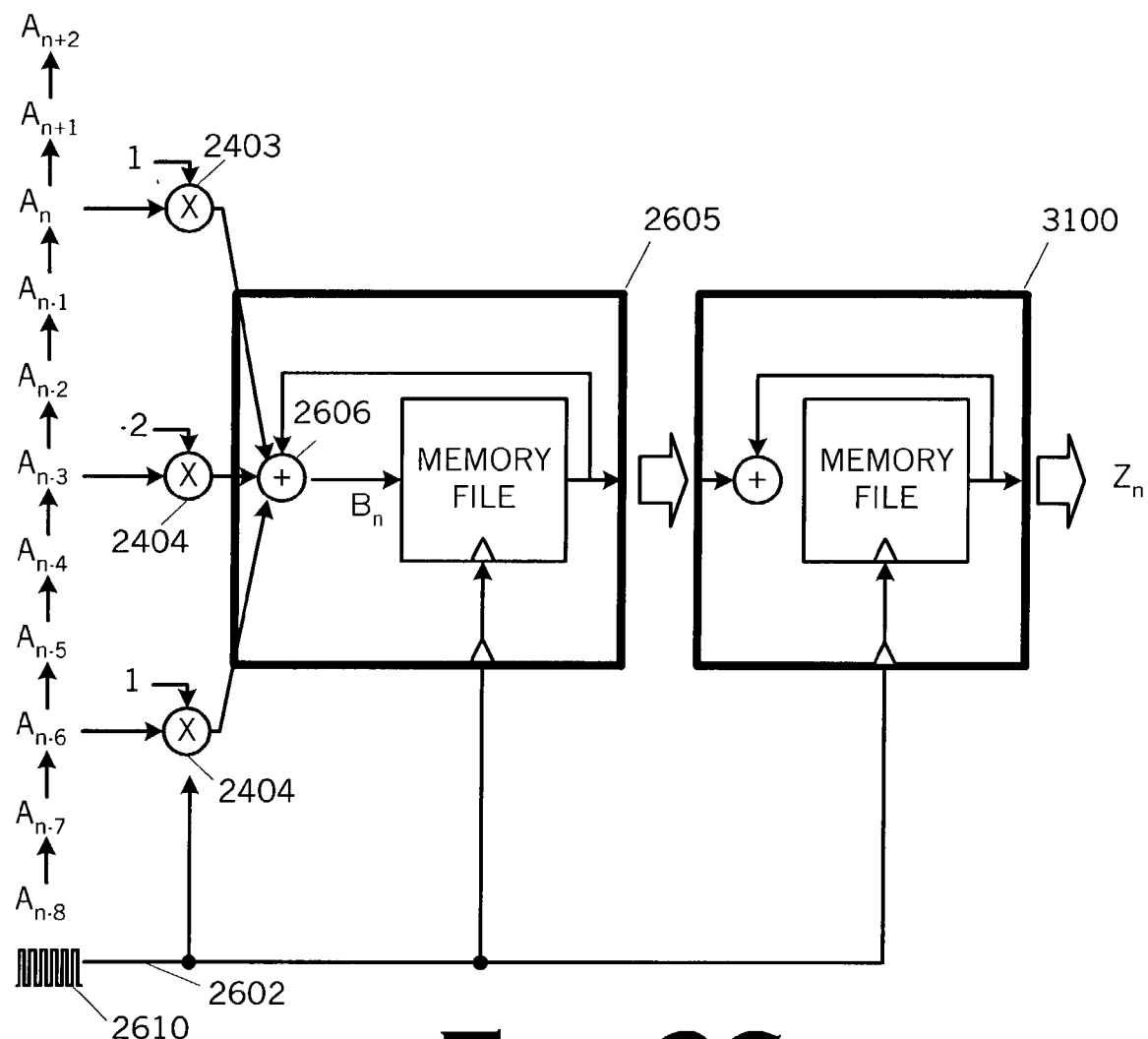

More particularly, FIG. 26 shows a complete D-A circuit including three multipliers 2403, 2404 and 2405, and a pair of accumulators 2605 and 3100 arranged for performing the convolution of the functions discussed and illustrated in connection with FIG. 17 and FIG. 18. A clock line 2602 is used to store and release data from the memory file 3110 and to advance the input data to be convolved. The circuit of FIG. 26 can perform the convolution of FIG. 17 and FIG. 18 with only three multiplies per convolution result ($Z_n$). The method requires five multipliers. For longer convolver streams, the savings are greater.

As an example for a specific DSP application concerning a LASER radar, the clock line 2610 provides a clock at a rate of 83.3 MHz, with a D-A coefficient designated for the input function every 4 nanoseconds.

While three multipliers 1803, 1804 and 1805 are shown, the multipliers 1803 and 1804 are unnecessary and can be bypassed because they are arranged to multiply by one. Moreover, a register performing a simple binary shift operation can replace the multiplier 1804 because its function, multiplying by a factor of two, is effected by a single binary shift. Such circuitry reduction is common, expected and considered to be understood in the illustrated embodiments herein because, by their nature, D-A coefficients are generally small numbers.

Figure 27:
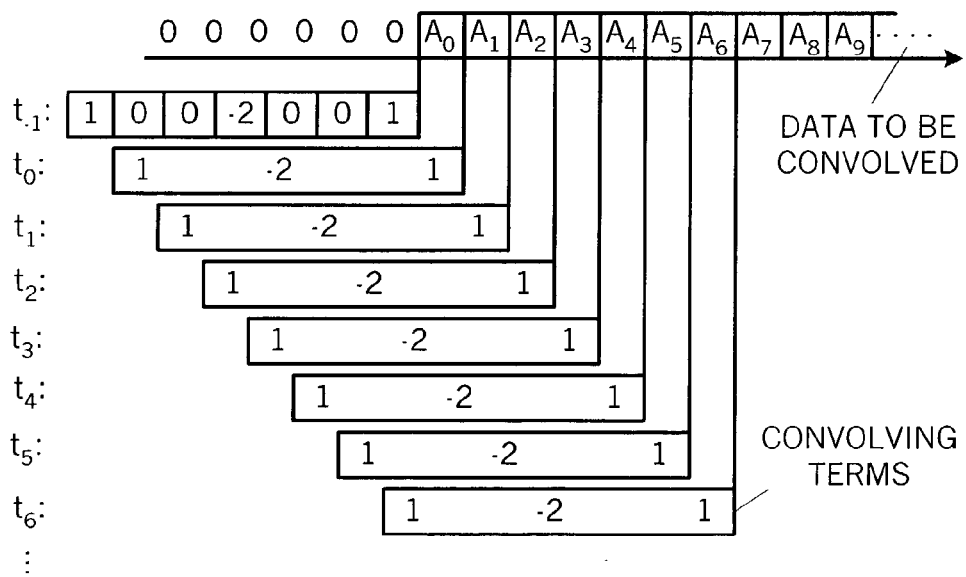

FIG. 27 and FIG. 28 illustrate the mathematics of these computations provided by the convolution result ($Z_n$) of FIG. 26. The data to be convolved is shown along the top horizontal axis of the table of FIG. 27, and the left vertical axis illustrates the convolving coefficients which are effectively slid across the data. At each sample time, the data values are read, multiplied by the D-A coefficients, summed, and double accumulated, as previously discussed. Note that the results are the same as the implementation of FIG. 15. Since most of the D-A coefficients are equal to zero and two of the coefficients are equal to one, far less multiplies are necessary. In FIG. 28, a table shows the results of the convolution performed by the D-A circuit of FIG. 26. In FIG. 26 and FIG. 27: "n" is the sample count; "$B_n$" 2603 is the output of summer 2601 for the sample count given by "n"; "$C_n$" is the output of the first accumulator 2606 for the sample count given by "n"; and "$Z_n$" is the convolution result at the time of the sample count "n".

Figure 29:
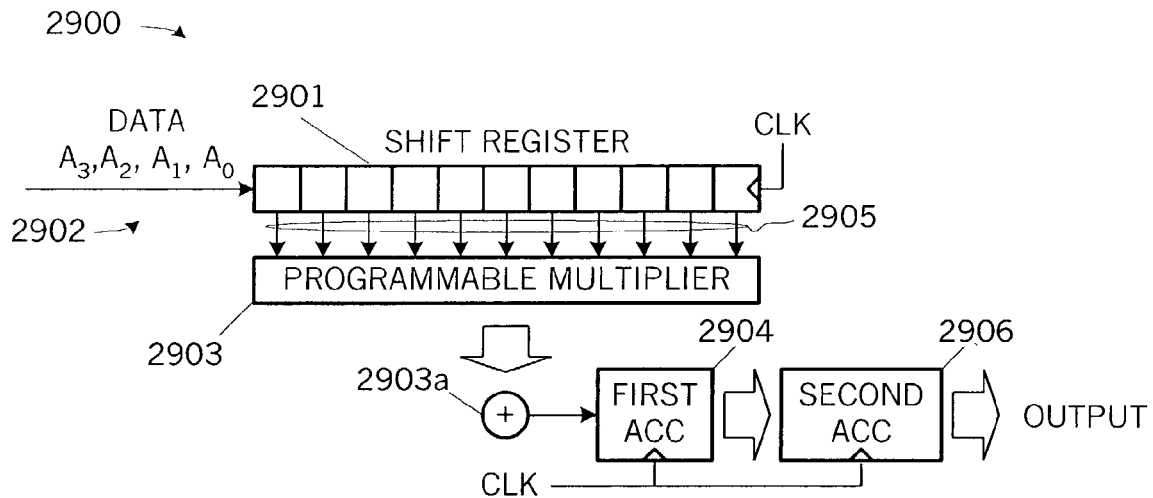

The matched filter 1114, first shown in FIG. 11, can be implemented using a variety of different circuits or software (including firmware) implementations. FIG. 29 shows a software programmable, shift register implementation 2900 of the D-A convolving method. Data samples 2902 are shifted into a shift register 2901. Each stage of the shift register 2901 has a respective output 2905 that enters a programmable multiplier 2903. The programmable multiplier 2903 selects which outputs 2905 to use and how to weight each of the selected outputs. Using the example of FIG. 12 and FIG. 20, the multiplier 2903 uses only the first, third and sixth stages of the shift register 2901. Using the D-A coefficients from FIG. 12, the first stage is weighted by 1, the third stage is weighted by (−2), and the sixth stage is weighted by 1. The products from the multiplier 2903 are fed to a summer 2903a. The summer 2903a feeds the first accumulator 2904. The first accumulator 2904 feeds the second accumulator 2906. And finally, the result is output from the second accumulator 2906.

Figure 30:
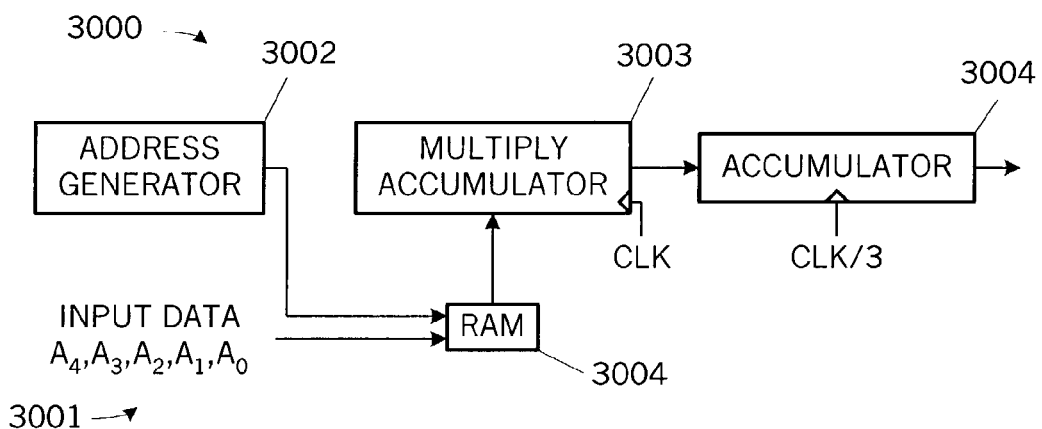

A RAM-based convolver may also be used to implement the matched filter 1114. FIG. 30 shows a D-A convolver 3000 implemented in the hardware or software RAM-based matching filter. RAM memory 3004 holds input data 3001 and D-A coefficients (1, (−2) and 1, from the example of FIG. 20). Each clock cycle, multiply-accumulator 3003 multiplies a single D-A coefficient by a single data sample.

Address generator 3002 is responsible for sequencing the correct order of data samples and D-A coefficients into multiplier-accumulator 3003. The output of multiply-accumulator 3003 feeds accumulator 3005. The accumulator 3005 is clocked at a fraction of the system clock rate. The fraction is equal to (1/(number of D-A coefficients)). This allows the accumulator 3005 to receive and sum, over 3 system clock cycles, the same three data points that accumulator 2605 would receive and sum over a single clock cycle.

Returning now to FIG. 7, the timing of the operations in the capture unit 720 and the process unit 740 are controlled, indirectly, by the laser clock 710. The laser clock 710 is input to a timer 745, whose output is input to the capture unit 720 and a sequencer 750. The output of the sequencer 750 is input to the process unit 740.

The output of the capture and process unit 330 includes the pulse intensity and pulse detect data input to the AGC 340 as discussed above relative to FIG. 5A. This information is acted upon as previously discussed to control the gain of the detector array 310 via the detector array gain signal 395, also shown in FIG. 7. The detector array 310 includes not only the photodiodes 660, but also the post-amplifiers 765, as was previously discussed. The post amp array 755 amplifies the optical signal picked up by the photodiodes 660, and thus directly determines the gain of detector array 310 as a whole. The detector array gain signal 395 is applied to the post amp array 755 to control that gain.

Still referring to FIG. 7, the PCE 115 also includes a heater, including a sensor, 775 and a heater control 780. The heater 775 and heater control 780 maintain the operational temperature of the detector array 310 within some predetermined temperature range. In some applications, heating has been found to improve the efficacy of the detector array 310. Embodiments not intended for cooler operational environments may, however, omit the heater 775. Thus, the heater 775 is not necessary to the practice of the invention.

Turning now to the ATR System 120, FIG. 32 conceptually illustrates the electronics 3200 of the ATR system 120 in a block diagram. Note that the illustrated embodiment of the LADAR system 100 is a flying submunition, although the invention is not so limited. The end use of the LADAR system 100, in the illustrated embodiment, is to identify and destroy enemy targets 130 of interest. Thus, the LADAR system 100 includes the ATR system 120. However, the invention admits wide variation in end uses and, consequently, may be employed in numerous applications in alternative embodiments. Many of these alternative embodiments may use the three-dimensional data set 380 in different ways such that they omit or replace the ATR system 120. The ATR system 120, therefore, is not necessary to the practice of the invention.

Returning to FIG. 32, the ATR system 120 includes a processor 3205 communicating with some storage 3210 over a bus system 3215. The storage 3210 may include a hard disk and/or RAM and/or removable storage, such as a floppy magnetic disk or an optical disk. In the illustrated embodiment, the storage 3210 includes at least a read-only memory 3218 in which operating system 3220 and the application 3225 are encoded and the RAM 730 in which the data structure 3230 is encoded. The data structure 3220 stores the three-dimensional data set 380 acquired as discussed above by the PCE 115 from the captured return pulse. The processor 3205 runs under the control of the operating system 3230, which may be practically any operating system known to the art. The processor 3205, under the control of the operating system 3230, invokes the application 3225 on startup. The application 3225, when executed by the processor 3205, performs any processing or preprocessing on the three-dimensional data set 380 stored in the data structure 3225. More particularly, the application 3225 implements, in the illustrated embodiment, the method 3300 shown in FIG. 33 and discussed more fully immediately below.

FIG. 33 illustrates the handling by the processor 3205, through the application 3265, of the three-dimensional data set 380 encoded on the storage 3210. The LADAR three-dimensional data set 380 is stored in a row column format (at 3350). This further processing generally involves preprocessing (at 3352), detection (at 3354), segmentation (at 3356), feature extraction (at 3358), and classification (at 3360). Each of these processing steps shall now be discussed further.

Generally, the preprocessing (at 3352) is directed to minimizing noise effects, such as identifying so-called intensity dropouts in the converted three-dimensional data set 380, where the range value of the data is set to zero. Noise in the converted three-dimensional data set 380 introduced by low signal-to-noise ratio ("SNR") conditions is processed so that performance of the overall LADAR system 100 is not degraded. In this regard, the three-dimensional data set 380 is used so that absolute range measurement distortion is minimized, edge preservation is maximized, and preservation of texture step (that results from actual structure in objects being imaged) is maximized.

In general, detection (at 3354) identifies specific regions of interest in the three-dimensional data set 380. The detection (at 3354) uses range cluster scores as a measure to locate flat, vertical surfaces in an image. More specifically, a range cluster score is computed at each pixel to determine if the pixel lies on a flat, vertical surface. The flatness of a particular surface is determined by looking at how many pixels are within a given range in a small region of interest. The given range is defined by a threshold value that can be adjusted to vary performance. For example, if a computed range cluster score exceeds a specified threshold value, the corresponding pixel is marked as a detection. If a corresponding group of pixels meets a specified size criteria, the group of pixels is referred to as a region of interest. Regions of interest, for example those regions containing one or more targets, are determined and passed to a segmenter for further processing.

Segmentation (at 3356) determines, for each detection of a target 130 (shown in FIG. 1 and in FIG. 2), which pixels in a region of interest belong to the detected target 130 and which belong to the detected target's background. Segmentation (at 3356) identifies possible targets, for example, those whose connected pixels exceed a height threshold above the ground plane. More specifically, the segmentation (at 3356) separates target pixels from adjacent ground pixels and the pixels of nearby objects, such as bushes and trees.

Feature extraction (at 3358) provides information about a segmentation (at 3356) so that the target 130 and its features in that segmentation can be classified. Features include, for example, orientation, length, width, height, radial features, turret features, and moments. The feature extraction (at 3358) also typically compensates for errors resulting from segmentation (at 3356) and other noise contamination. Feature extraction (at 3358) generally determines a target's three-dimensional orientation and size and a target's size. The feature extraction (at 3358) also distinguishes between targets and false alarms and between different classes of targets.

Classification (at 3360) classifies segmentations to contain particular targets, usually in a two stage process. First, features such as length, width, height, height variance, height skew, height kurtosis, and radial measures are used to initially discard non-target segmentations. The segmentations that survive this step are then matched with true target data stored in a target database. The data in the target database, for example, may include length, width, height, average height, hull height, and turret height to classify a target. The classification (at 3360) is performed using known methods for table look-ups and comparisons.

Data obtained from the segmentation (at 3356), the feature extraction (at 3358), and the classification (at 3360) may, in some embodiments, be displayed in one of a variety of user-selectable formats. Typical formats include a three-view commonly used by armed forces to identify targets during combat, a north reference plan view, or a rotated perspective. These display options available to the operator, either local or remote, are based on the three-dimensional nature of the LADAR image. The results of the feature extraction (at 3358) provide target information including orientation, length, width and height. The target image can be displayed from any perspective, independent of the sensor perspective, and the operator can select one of the several display formats that utilize the adjustable perspective.

The data obtained from the segmentation (at 3356) is then used in identifying, or "recognizing," the target. One suitable method for this identification is disclosed in:

U.S. Pat. No. 5,893,085, entitled "Dynamic Fuzzy Logic Process for Identifying Objects in Three-Dimensional Data," issued Apr. 6, 1999, to Lockheed Martin Corp. as the assignee of the inventors Ronald W. Philips, et al.

Other suitable techniques may also be employed. The LADAR system 100 then takes a preprogrammed course of action predicated on the identity of the target. However, in alternative embodiments, the data may be presented to a user, typically in a three-dimensional image. Techniques for this end use are disclosed in:

U.S. Pat. No. 5,644,386, entitled "Visual Recognition System for LADAR Sensors," issued Jul. 1, 1997, to Loral Vought Systems Corp. as assignee of the inventors Gary Kim Jenkins, et al.; and U.S. Pat. No. 5,852,492, entitled "Fused Lasar Range/Intensity Image Display for a Human Interpretation of Lasar Data," issued Dec. 22, 1998, to Lockheed Martin Vought Systems Corp. as the assignee of the inventors Donald W. Nimblett, et al.

However, this aspect of the invention will be implementation specific, depending upon the intended end-use of the LADAR system 100.

Many aspects of the processing by the ATR system 120 are software-implemented, especially the method 3300 in FIG. 33. Some portions of the detailed descriptions herein consequently are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 34:
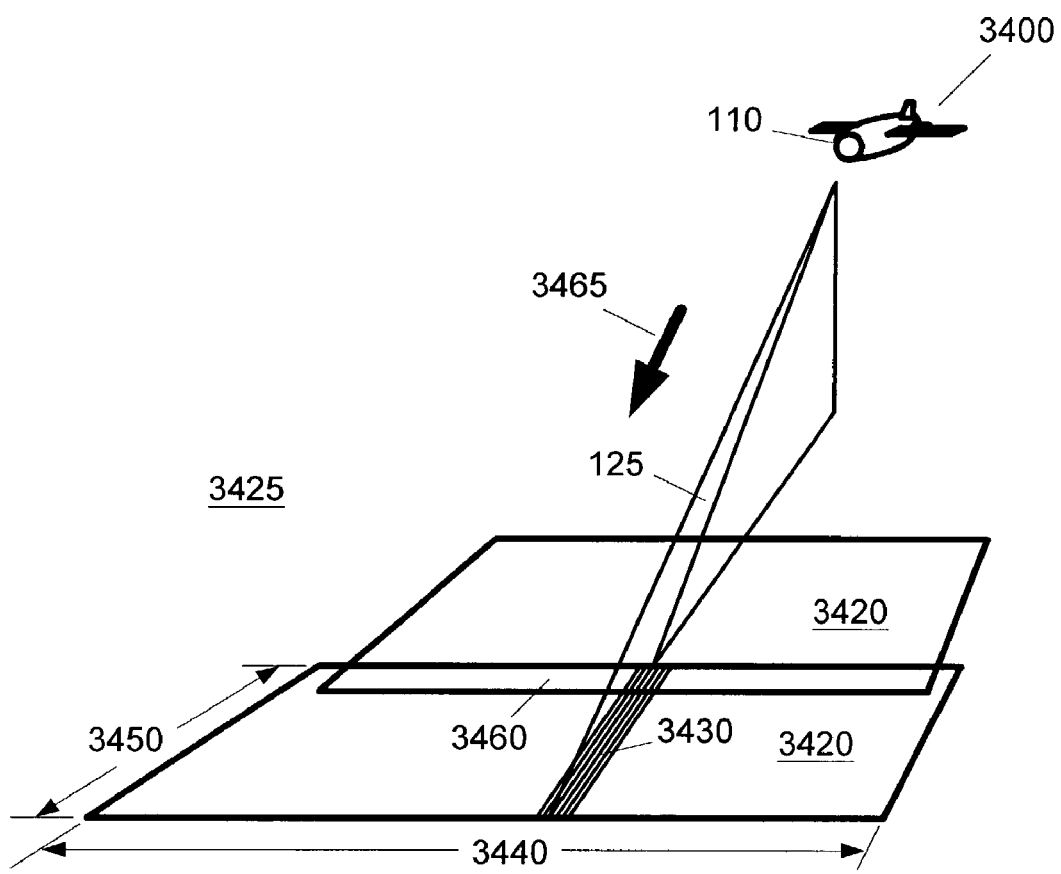
FIG. 34 conceptually illustrates the operation of the LADAR transceiver of FIG. 1 in one particular embodiment of the present invention.

The operation of this particular implementation of the LADAR transceiver 110 in the LADAR system 100 is conceptually illustrated in FIG. 34. The emitted pulse 125 is transmitted by the optical train (shown in FIG. 6) of the LADAR transceiver 110 on the platform 3410 to scan a geographical area called a scan pattern 3420. Each scan pattern 3420 is generated by scanning elevationally, or vertically, several times while scanning azimuthally, or horizontally, once within the field of view 3425 for the platform 3410 within the field of view 220, shown in FIG. 2. The scan patterns are sometimes, and will be hereafter herein, referred to as "footprints." FIG. 34 illustrates a single elevational scan 3430 during the azimuthal scan 3440 for one of the footprints 3420. Thus, each footprint 3420 is defined by a plurality of elevational scans 3450 such as the elevational scan 3430 and the azimuthal scan 3440. The principal difference between the successive footprints 3420 is the location of the platform 3410 at the start of the scanning process. An overlap 3460 between the footprints 3420 is determined by the velocity of the platform 3410 in the direction of an arrow 3465. The velocity, depression angle of the sensor with respect to the horizon, and total azimuth scan angle of the LADAR platform 3410 determine the footprint 3420 on the ground.

Figure 2:
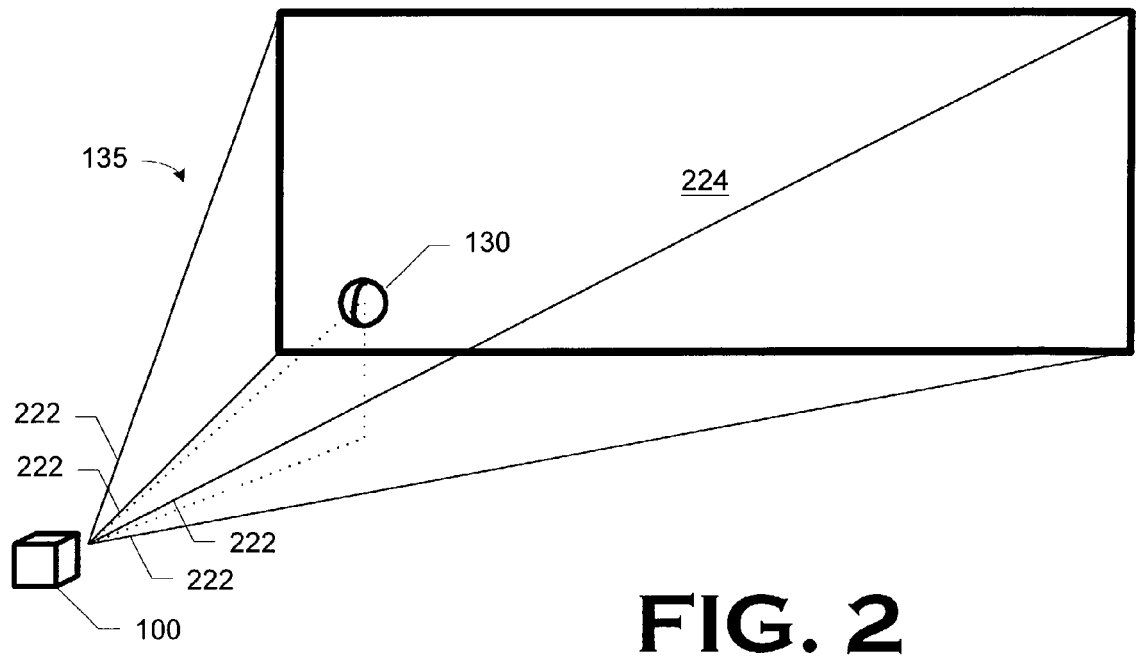
FIG. 2 conceptually illustrates the relative position of the LADAR system of FIG. 1 to a target within a field of view during data acquisition.
Figure 35:
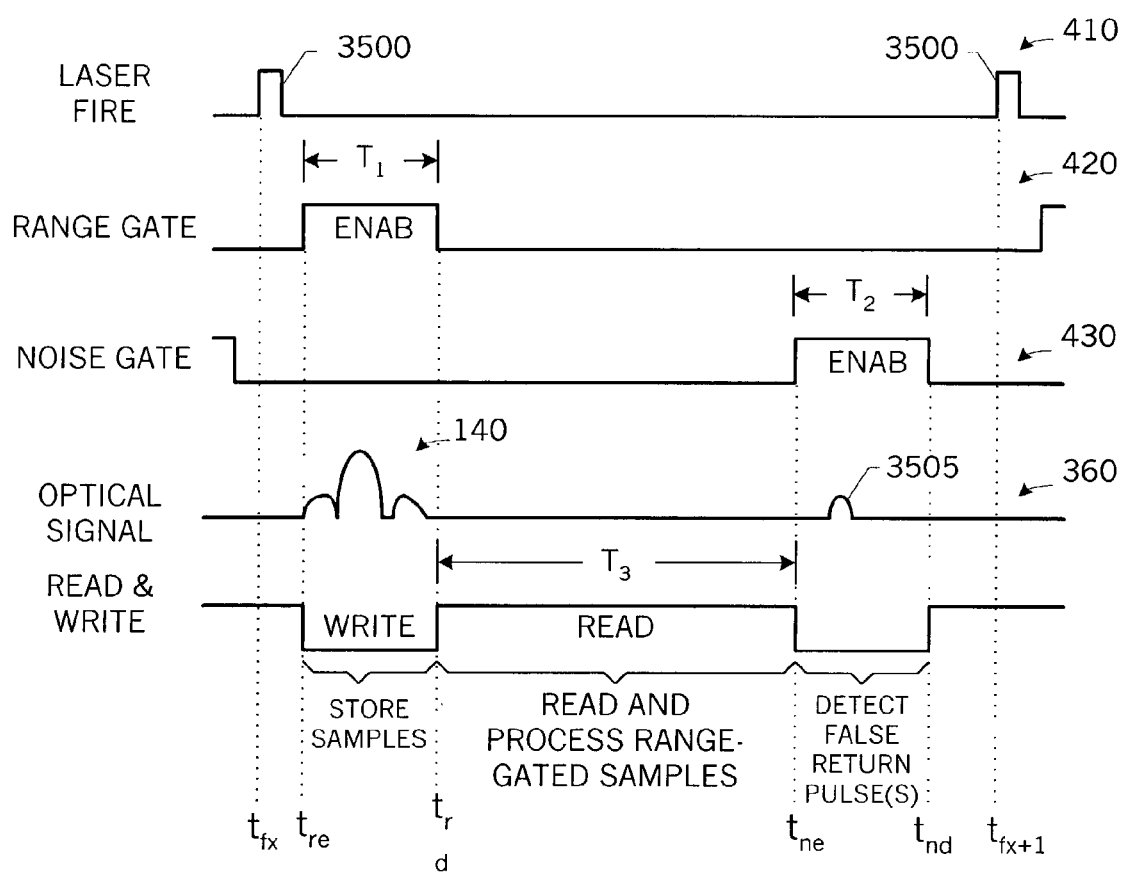
FIG. 35 is a timing diagram of signals employed in one particular embodiment of the present invention.

As the LADAR transceiver 110 scans the field of view 220, shown in FIG. 2, azimuthally and elevationally as described immediately above, it continually emits LASER pulses 125, shown in FIG. 1, in a train. The train of LASER pulses 125 is generated and transmitted as described above relative to FIG. 6. Each LASER pulse 125 in the train is fired by a trigger pulse 3500 shown in FIG. 35, at a time $t_{fx}$ in the period of the clock 410, also shown in FIG. 35.

As described with respect to FIG. 1 and FIG. 2, the LASER pulses 125 are reflected from a target 130 back to the LADAR transceiver 110. At $t_{re}$, as was described relative to FIG. 4, the range gate of the PCE 115 is enabled for the period $T_1$. During the period $T_1$, the return pulse 140, shown in FIG. 1, is received by the LADAR transceiver 110 and captured by the capture unit 720, shown in FIG. 7, of the capture and process unit 330 of the PCE 115. As described above, this involves collection of the return pulse 140 as described relative to FIG. 6, detection by the detector array 310 as described relative to FIG. 3 and FIG. 6. The capture unit 720 stores the captured return pulse 140 in the RAM 730, also shown in FIG. 7, in a row-column format.

During the period T1, the AGC 340, shown in FIG. 3 and in FIG. 7, may automatically adjust the gain of the post amps 755 and, hence, the detector array 310. As was discussed relative to FIG. 5A, the AGC 340 will compare the intensity of the returned pulse 140 as reflected in the optical signal 360 to the predetermined value. The AGC 340 will then increment the counter 510, shown in FIG. 5A, if the comparison shows the intensity is too low relative to the predetermined value. If the AGC 340 increments the counter 510, the gain of the detector array 310 is proportionally increased through the attenuator 550. Note that this increase is responsive to the comparison.

Returning to FIG. 35, at time $t_{rd}$, the range gate is disabled, the time period $T_1$ terminates, and the time period $T_3$ commences. The process unit 740, shown in FIG. 7, reads the gated samples stored in the RAM 730, and processes them as discussed above to generate the three dimensional data set 380. The period $T_3$ terminates at $t_{ne}$, at which time the read from the RAM 730 is no longer enabled.

However, at $t_{ne}$, the period $T_2$ begins with the noise gate enable. The PCE 115 assumes that any "pulse," e.g., the noise event 3505, detected during the period $T_2$ is generated from noise since it expects all return pulses 140 to be detected in the period $T_1$. It is expected that a noise event will only be detected relatively rarely. However, when a noise event 3505 is detected, the AGC 340 decrements the counter 510, shown in FIG. 5A, as was discussed relative to that figure. Decrementing the counter 510 reduces the gain of the detector array 310 proportionally through the attenuator 550. The period $T_2$ ends at $t_{nd}$, whereupon the noise gate is disabled. The process repeats upon the next firing of the LADAR transceiver 110 triggered by the trigger pulse 3500 at $t_{fx+1}$.

Figure 36:
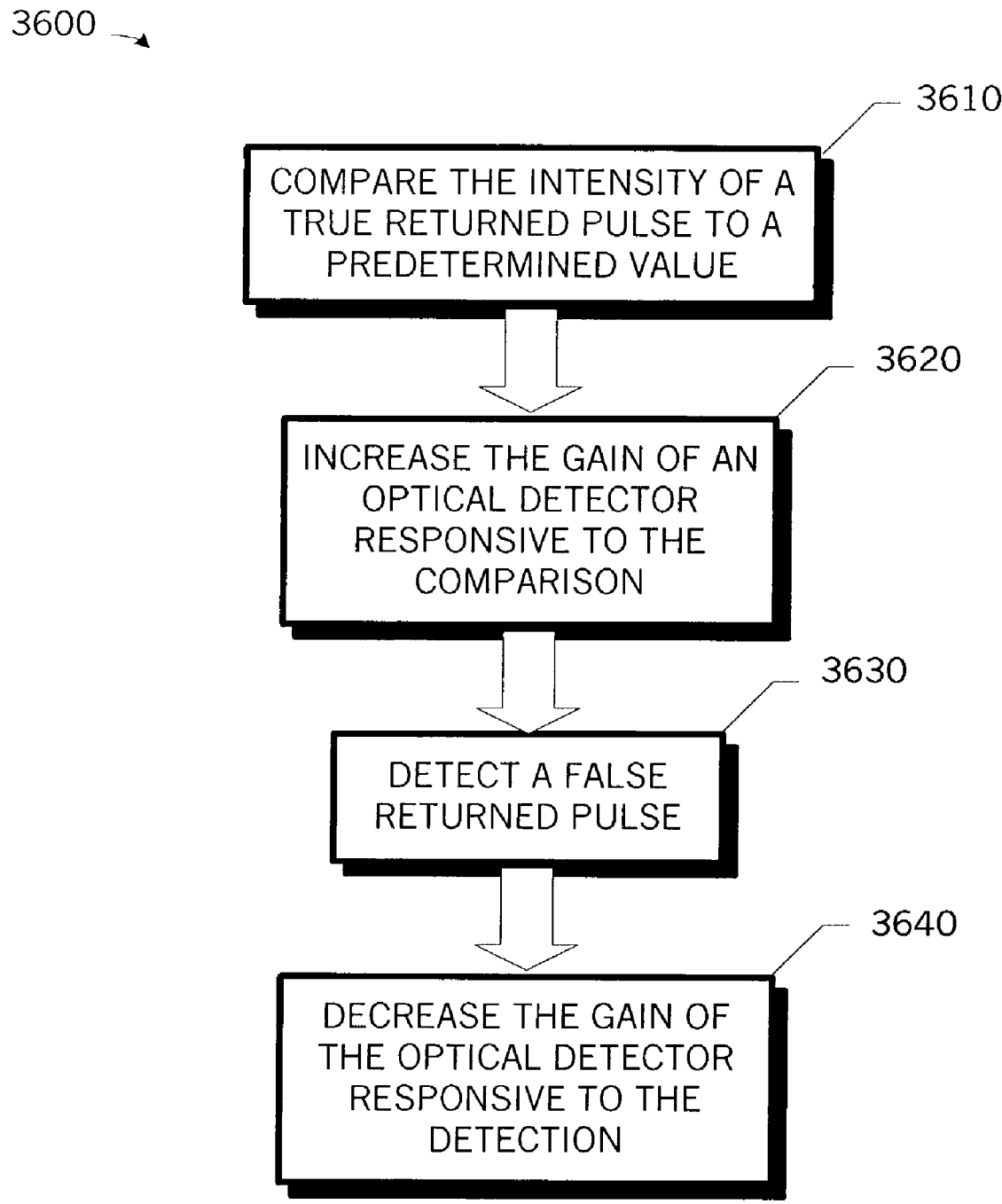
FIG. 36 illustrates one particular embodiment of a method for automatically controlling the gain of a receiver in an optical system in accordance with one aspect of the present invention.

Thus, in another aspect, the invention includes a method 3600, illustrated in FIG. 36, for automatically controlling the gain of a receiver in an optical system. The method 3600 includes comparing the intensity of a true return pulse to a predetermined value (at 3610); increasing the gain of an optical detector responsive to the comparison (at 3620); detecting a false returned pulse (at 3630); and decreasing the gain of the optical detector responsive to the detection (at 3630). Note that the order in which the gain is increased and decreased is not material to the practice of the invention and that the gain will not be adjusted (either up or down) in every operational cycle.

Figure 37:
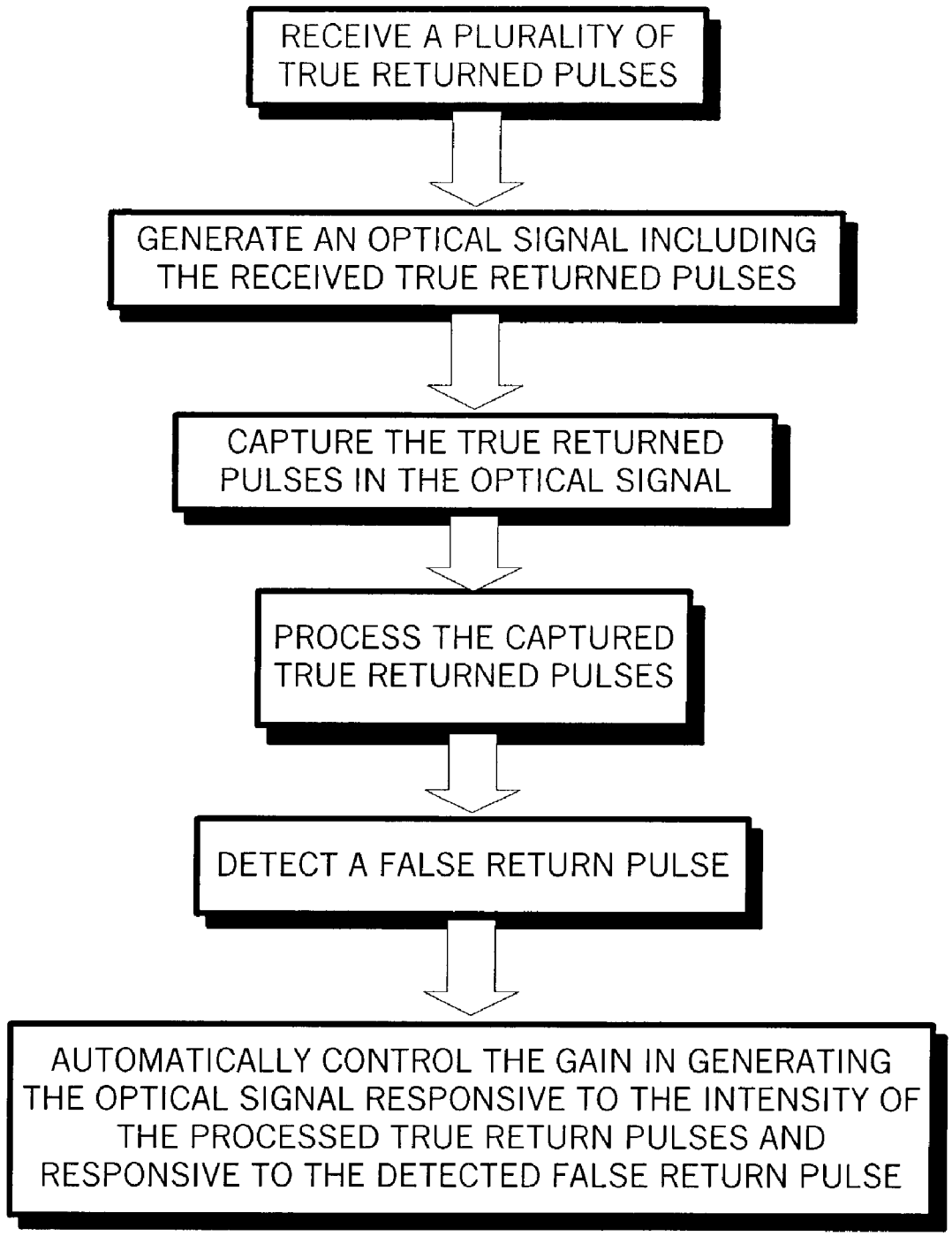
FIG. 37 illustrates another particular embodiment of a method for automatically controlling the gain of a receiver in an optical system in accordance with one aspect of the present invention.

In the context of the illustrated embodiment, the invention further includes a method 3700, illustrated in FIG. 37. The method 3700 includes:
receiving a plurality of true return pulses (at 3705);
generating an optical signal including the received true return pulses (at 3710);
capturing the true return pulses in the optical signal (at 3715);
processing the captured true return pulses (at 3720);
detecting a noise event (at 3725); and
automatically controlling the gain in generating the optical signal responsive to the intensity of the processed return pulses and responsive to the detected noise event (at 3730).

Again, the order in which the gain is increased and decreased is not material to the practice of the invention and that the gain will not be adjusted (either up or down) in every operational cycle.

This concludes the detailed description. The particular embodiments disclosed above are illustrative only, as the invention may be modified and practiced in different but equivalent manners apparent to those skilled in the art having the benefit of the teachings herein. For instance, the LADAR transceiver may, in alternative embodiments, emit a continuous, as opposed to pulsed, beam. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus, comprising:
an optical detector;
a threshold unit capable of converting an analog optical signal received by the optical detector to a digital representation thereof;
a capture unit capable of capturing the digital representation of the received optical signal;
a process unit capable of processing the captured digital representation; and
an automatic gain control capable of controlling the gain of the optical detector responsive to the content of the processed digital representation, wherein the automatic gain control drives the gain higher responsive to determining that the intensity of a return pulse in the optical signal is lower than a target value and drives the gain lower responsive to determining that the intensity of the return pulse in the optical signal is higher than the target value, the automatic gain control including:
an intensity median computation circuit capable of comparing the intensity of the return pulse to a predetermined value and outputting a first signal indicating the result of the comparison;
an up/down counter capable of receiving the first signal, incrementing and decrementing responsive to the first signal, and outputting a second signal proportional to the count therein;
a digital to analog converter capable of converting the second signal to an analog signal; and
an attenuator receiving the analog signal and attenuating a gain signal responsive to the analog signal.

2. The apparatus of claim 1, wherein the optical detector comprises an array of photodiodes.

3. The apparatus of claim 1, wherein the threshold unit includes a bank of voltage comparators.

4. The apparatus of claim 1, wherein the capture unit samples the digitized representation of the received optical signal and encodes the resultant samples proportionally to the peak of the digitized representation at the time it is sampled.

5. The apparatus of claim 1, wherein the capture unit includes:
a time demultiplexer capable of demultiplexing the digitized representation; and
a line encoder capable of encoding the demultiplexed digitized representation.

6. The apparatus of claim 1, further comprising a memory in which the capture unit is capable of buffering the captured digital representation and from which the process unit is capable of reading the buffered captured digital representation.

7. The apparatus of claim 1, wherein the process unit includes:
a convolution circuit capable of generating a filtered signal; and
a peak detect circuit capable of detecting the peak amplitude of the filtered signal.

8. The apparatus of claim 1, further comprising a constant false alarm rate circuit capable of detecting a noise event and clamping the content of the up/down counter.

9. An apparatus, comprising:
an optical detector;
a threshold unit capable of converting an analog optical signal received by the optical detector to a digital representation thereof;
a capture unit capable of capturing the digital representation of the received optical signal;
a process unit capable of processing the captured digital representation; and
an automatic gain control capable of controlling the gain of the optical detector responsive to the content of the processed digital representation, wherein:
the automatic gain control drives the gain higher responsive to determining that the intensity of a return pulse in the optical signal is lower than a target value and drives the gain lower responsive to determining that the intensity of the return pulse in the optical signal is higher than the target value; and
the target value is the median intensity value of the processed return pulses.

10. The apparatus of claim 9, wherein the optical detector comprises an array of photodiodes.

11. The apparatus of claim 9, wherein the threshold unit includes a bank of voltage comparators.

12. The apparatus of claim 9, wherein the capture unit samples the digitized representation of the received optical signal and encodes the resultant samples proportionally to the peak of the digitized representation at the time it is sampled.

13. The apparatus of claim 9, wherein the capture unit includes:
a time demultiplexer capable of demultiplexing the digitized representation; and
a line encoder capable of encoding the demultiplexed digitized representation.

14. The apparatus of claim 9, further comprising a memory in which the capture unit is capable of buffering the captured digital representation and from which the process unit is capable of reading the buffered captured digital representation.

15. The apparatus of claim 9, wherein the process unit includes:
a convolution circuit capable of generating a filtered signal; and
a peak detect circuit capable of detecting the peak amplitude of the filtered signal.

16. The apparatus of claim 9, further comprising a constant false alarm rate circuit capable of detecting a noise event and clamping the content of the up/down counter.

17. A method for automatically controlling the gain of a receiver in an optical system, comprising
comparing the intensity of a returned pulse to a target value, including comparing the intensity to a median value of a plurality of returned pulses; and
controlling the gain of an optical detector responsive to the comparison.

18. The method of claim 17, wherein controlling the gain of the optical detector includes:
incrementing and decrementing an up/down counter;
converting an output of the counter proportional to the content thereof to an analog signal; and
attenuating a power supply signal proportionally to the amplitude of the analog signal.

19. The method of claim 17, further comprising gating the comparison.

20. The method of claim 19, wherein gating the comparison includes: enabling the comparison in a time period in which a true return pulse is expected; and disabling the comparison otherwise.

21. The method of claim 17, further comprising clamping the upper bound of the controlled gain.

22. The method of claim 21, wherein clamping the upper bound includes:
 detecting a noise event; and
 decreasing the gain.

23. The method of claim 22, wherein decreasing the gain includes:
 decrementing an up/down counter;
 converting an output of the counter proportional to the content thereof to an analog signal; and
 attenuating a power supply signal proportionally to the amplitude of the analog signal.

24. A method for automatically controlling the gain of a receiver in an optical system, comprising:
 comparing the intensity of a returned pulse to a target value;
 controlling the gain of an optical detector responsive to the comparison;
 clamping the upper bound of the controlled gain, including:
  detecting a noise event; and
  decreasing the gain; and
 gating the detection.

25. The method of claim 24, wherein gating the comparison includes:
 enabling the detection in a time period in which a false returned pulse is expected; and
 disabling the detection otherwise.

26. The method of claim 24, wherein comparing the intensity of the returned pulse to the target value includes comparing the intensity to a median value of a plurality of returned pulses.

27. The method of claim 24, wherein controlling the gain of the optical detector includes:
 incrementing and decrementing an up/down counter;
 converting an output of the counter proportional to the content thereof to an analog signal; and
 attenuating a power supply signal proportionally to the amplitude of the analog signal.

28. The method of claim 24, further comprising gating the comparison.

29. The method of claim 28, wherein gating the comparison includes:
 enabling the comparison in a time period in which a true return pulse is expected; and
 disabling the comparison otherwise.

30. The method of claim 29, further comprising clamping the upper bound of the controlled gain.

31. The method of claim 30, wherein clamping the upper bound includes:
 detecting a noise event; and
 decreasing the gain.

32. The method of claim 31, wherein decreasing the gain includes:
 decrementing an up/down counter;
 converting an output of the counter proportional to the content thereof to an analog signal; and
 attenuating a power supply signal proportionally to the amplitude of the analog signal.

33. A method comprising:
 receiving a plurality of return pulses;
 generating an optical signal including the received return pulses;
 capturing the return pulses in the optical signal;
 processing the captured return pulses;
 detecting a noise event in the capture of the return pulses; and
 automatically controlling the gain in generating the optical signal responsive to the intensity of the processed return pulses and responsive to the detected noise event, including comparing the intensity of the returned pulses to a target value, wherein comparing the intensity of the returned pulses to the target value includes comparing the intensity to a median value of a plurality of returned pulses.

34. The method of claim 33, wherein automatically controlling the gain in generating the optical signal includes:
 comparing the intensity of each true return pulse to a target value; and
 adjusting the gain of an optical detector responsive to the comparison.

35. The method of claim 33, wherein automatically controlling the gain includes:
 incrementing and decrementing an up/down counter responsive to the comparison;
 converting an output of the counter proportional to the content thereof to an analog signal; and
 attenuating a power supply signal proportionally to the amplitude of the analog signal.

36. The method of claim 34, further comprising gating the comparison.

37. The method of claim 33, further comprising clamping the upper bound of the controlled gain.

38. The method of claim 33, further comprising:
 generating a train of optical pulses;
 scanning a field of view while transmitting the train of optical pulses such that, upon encountering an object in the field of view, they are reflected as the return pulses.

39. The method of claim 33, wherein processing the captured return pulses generates a three-dimensional data set.

40. The method of claim 39, further comprising identifying a target from the three-dimensional data set.

41. The method of claim 33, wherein generating the optical signal includes:
 detecting the received return pulses; and
 digitizing the detected return pulses.

42. The method of claim 33, wherein capturing the return pulses includes:
 sampling the optical signal; and
 encoding the samples of the optical signal.

43. The method of claim 42, wherein capturing the return pulses includes buffering the encoded samples.

44. The method of claim 33, wherein processing the captured return pulses includes filtering the optical signal through a finite impulse response filter.

45. The method of claim 44, further comprising linearizing the captured optical signal.

* * * * *